July 19, 1966 H. G. JENSEN ETAL 3,261,443
PRICE, CREDIT, AND CHANGE SENSING APPARATUS
FOR COIN-RESPONSIVE EQUIPMENT
Filed Jan. 6, 1964 17 Sheets-Sheet 1
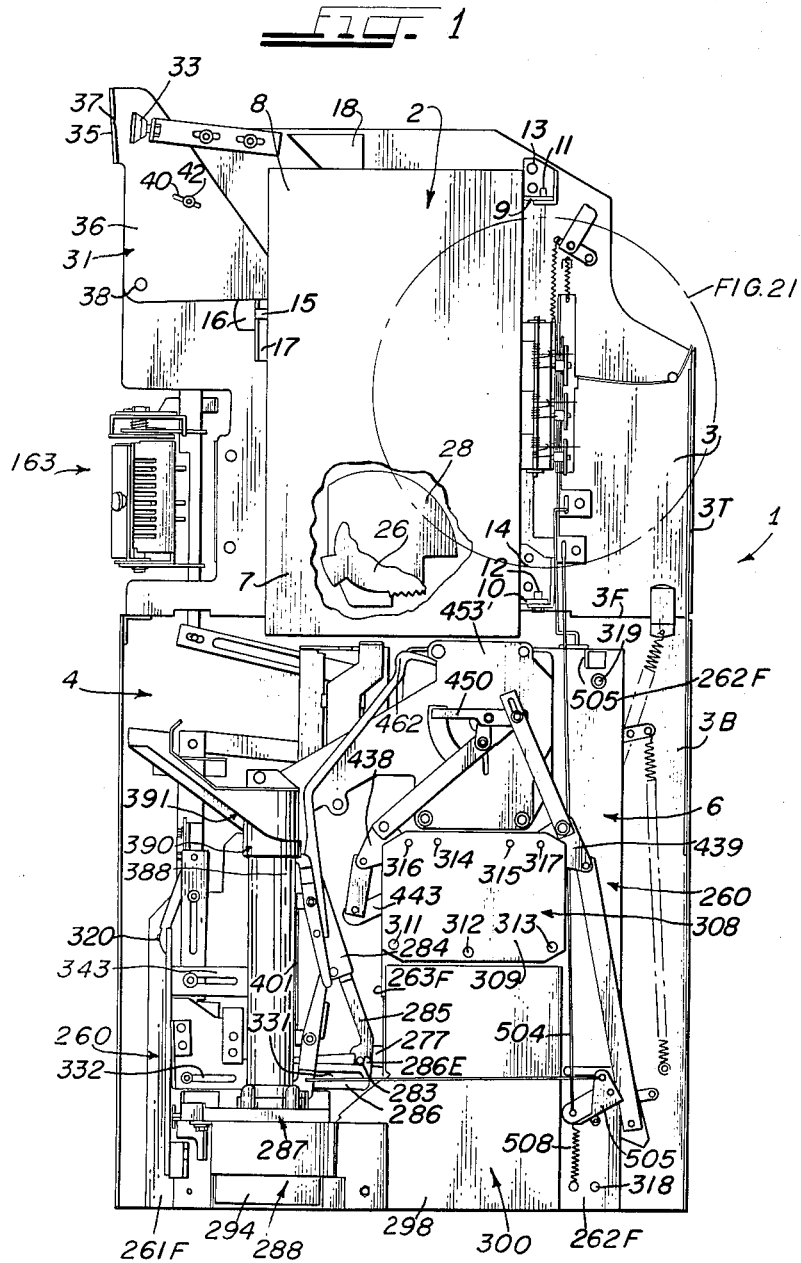
INVENTORS.
HERMAN G. JENSEN
JOSEPH E. WRIGHT, JR.
JOHN F. SHRAGAL July 19, 1966 H. G. JENSEN ETAL 3,261,443
PRICE, CREDIT, AND CHANGE SENSING APPARATUS
FOR COIN-RESPONSIVE EQUIPMENT
Filed Jan. 6, 1964 17 Sheets-Sheet 3

INVENTORS.
HERMAN G. JENSEN
JOSEPH E. WRIGHT, JR.
JOHN F. SHRAGAL
BY
ATTY

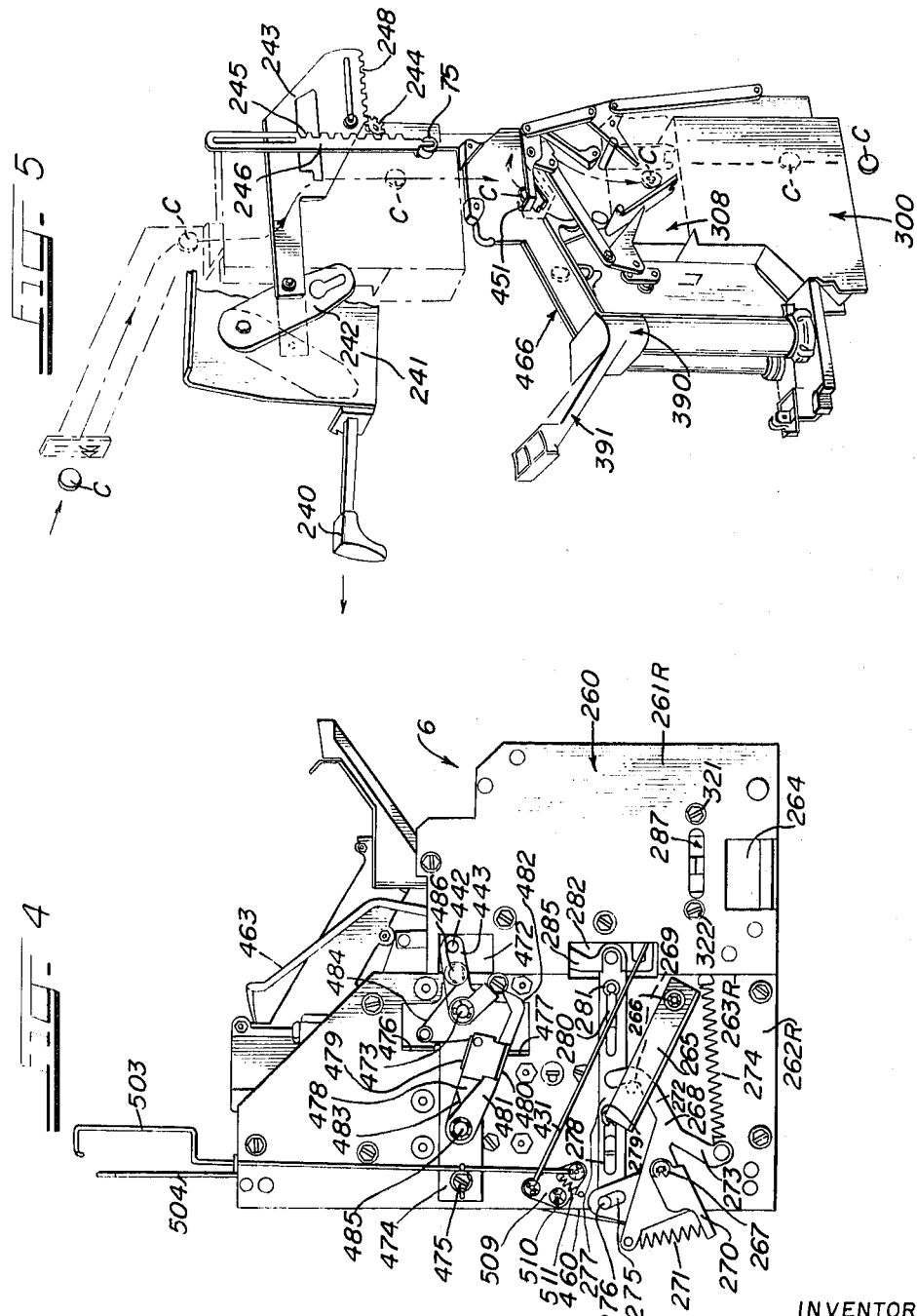

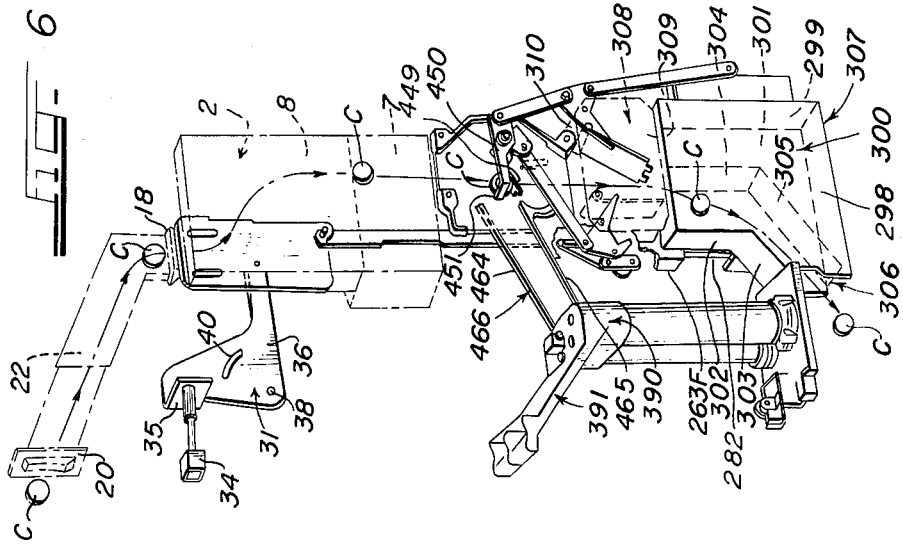
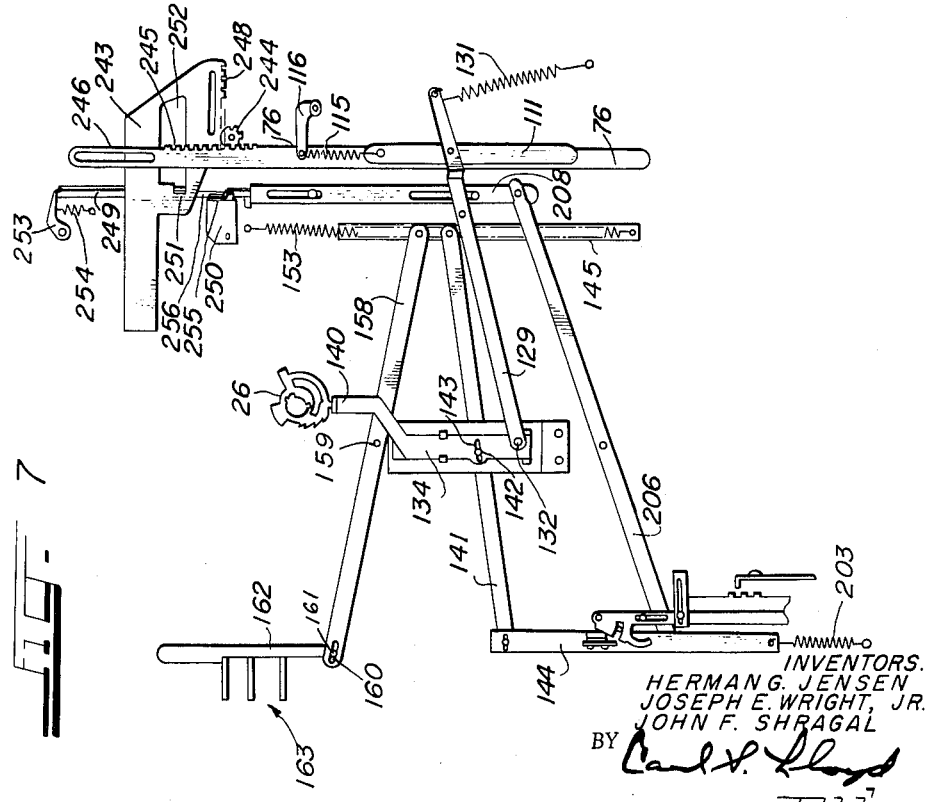

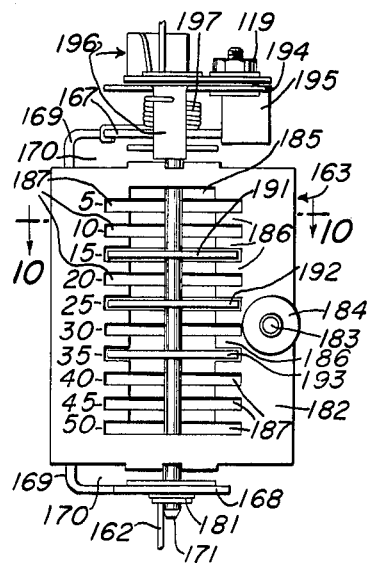

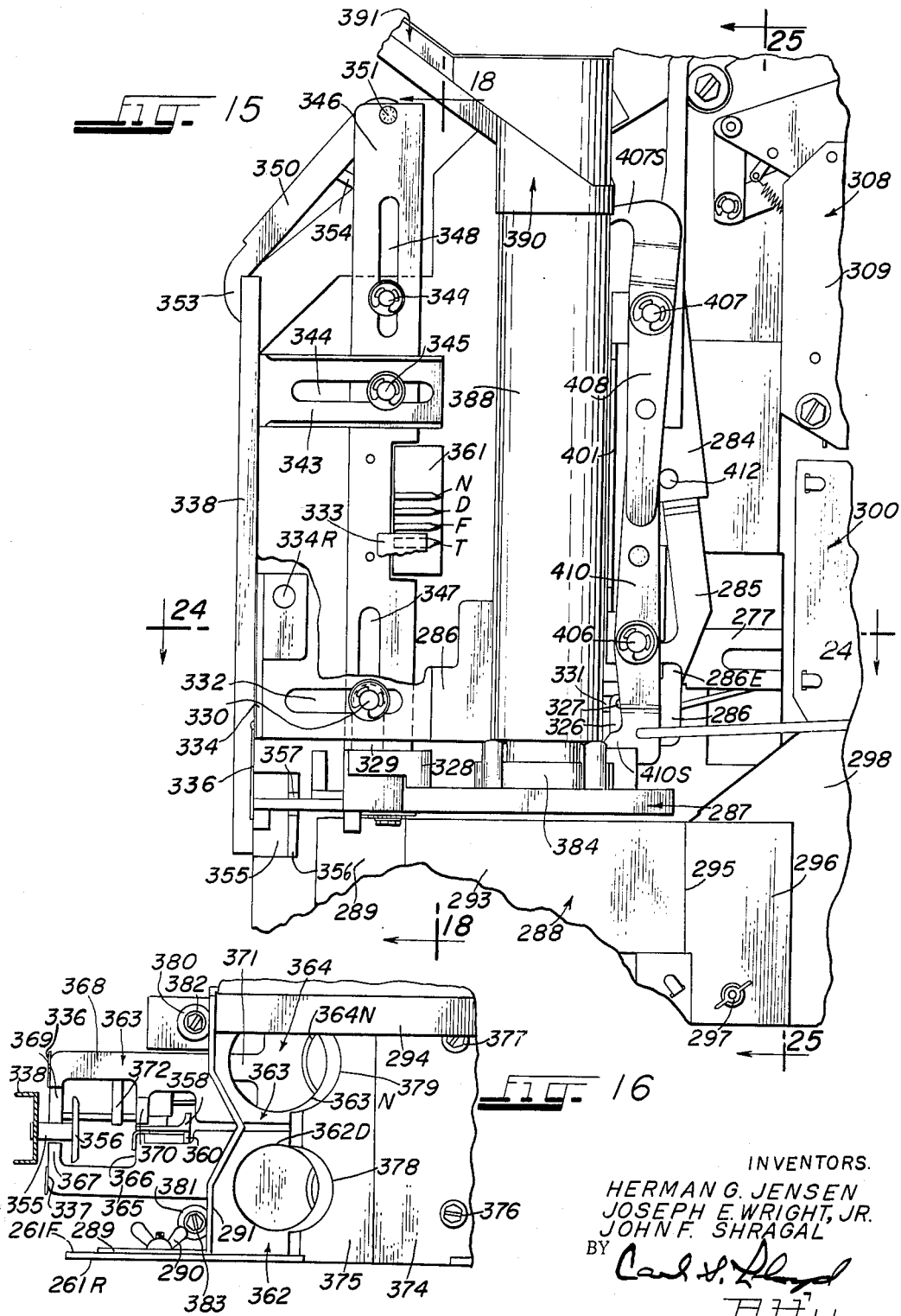

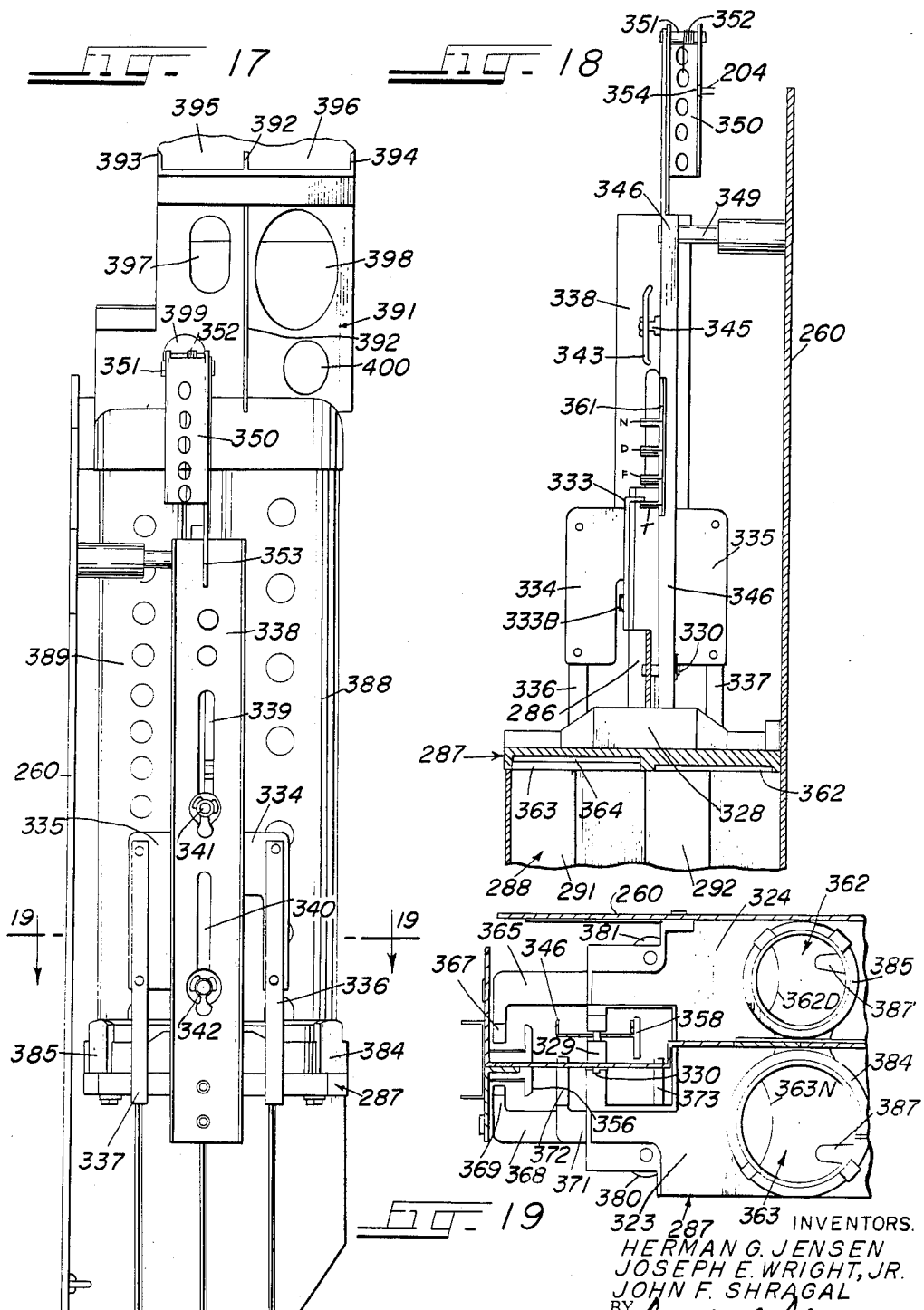

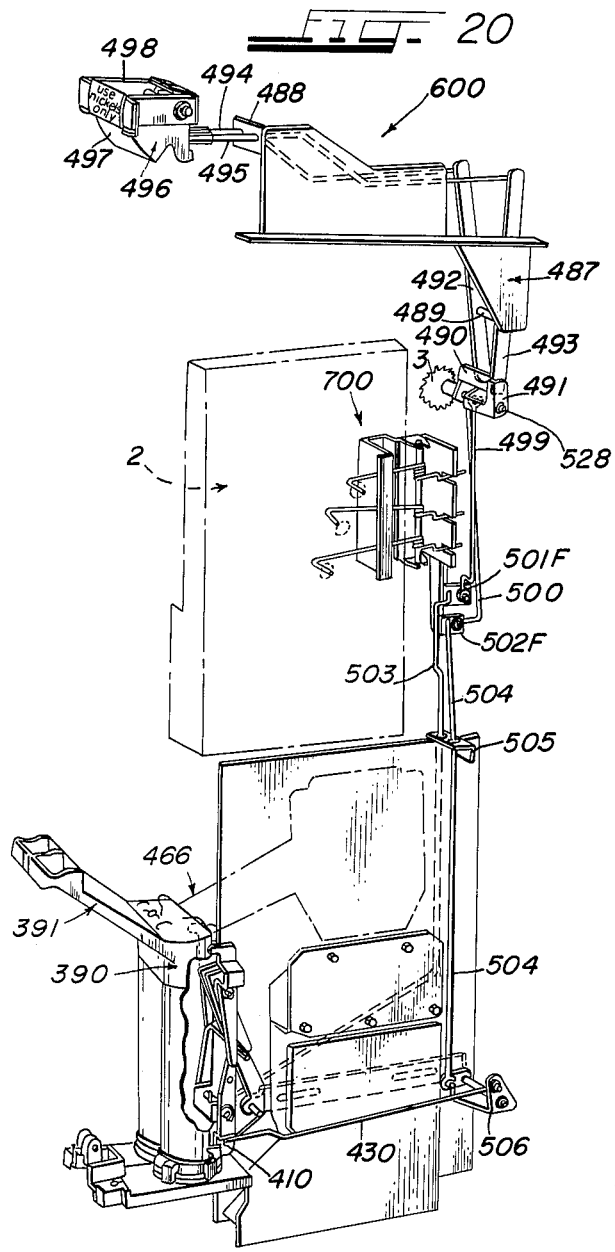

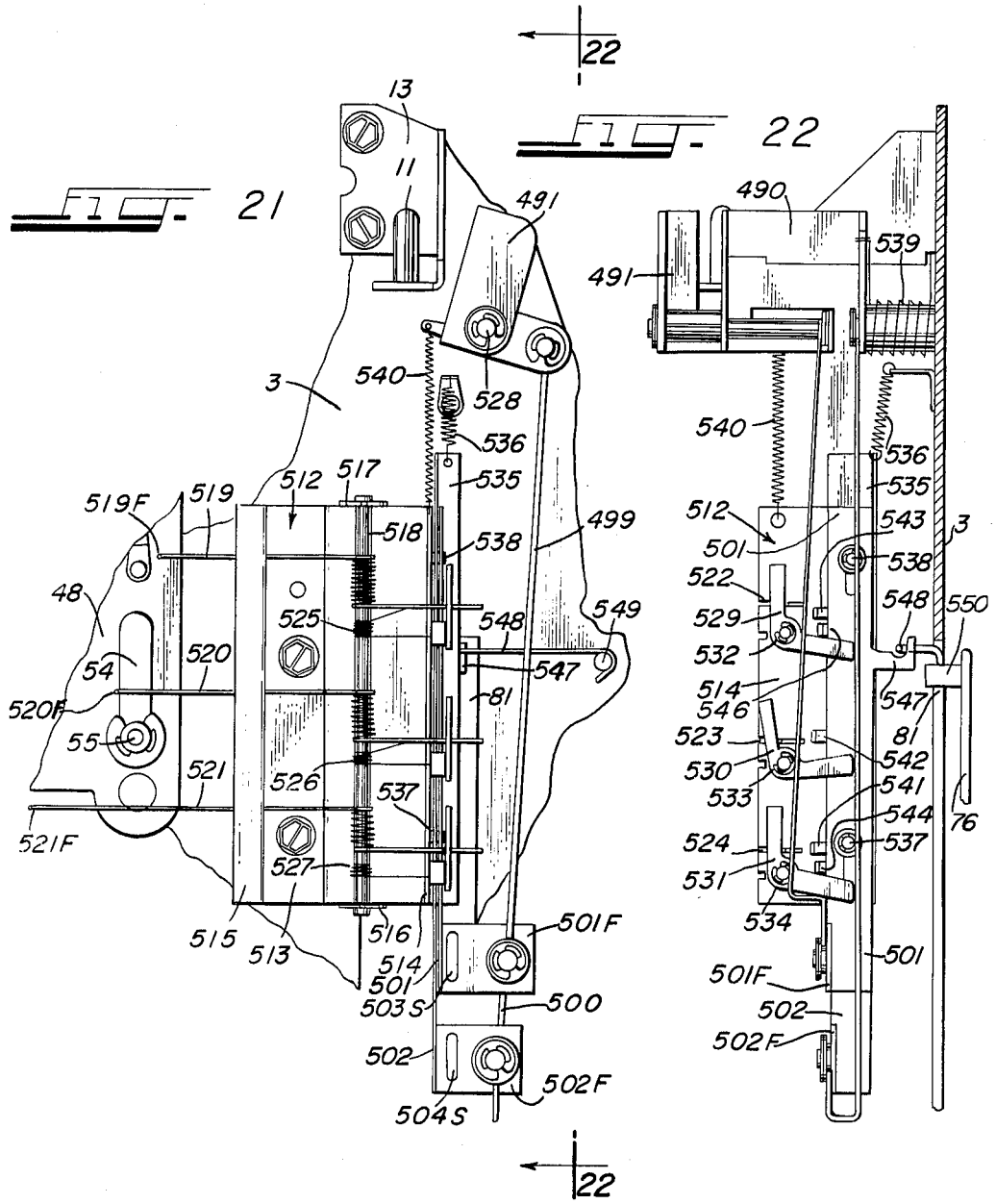

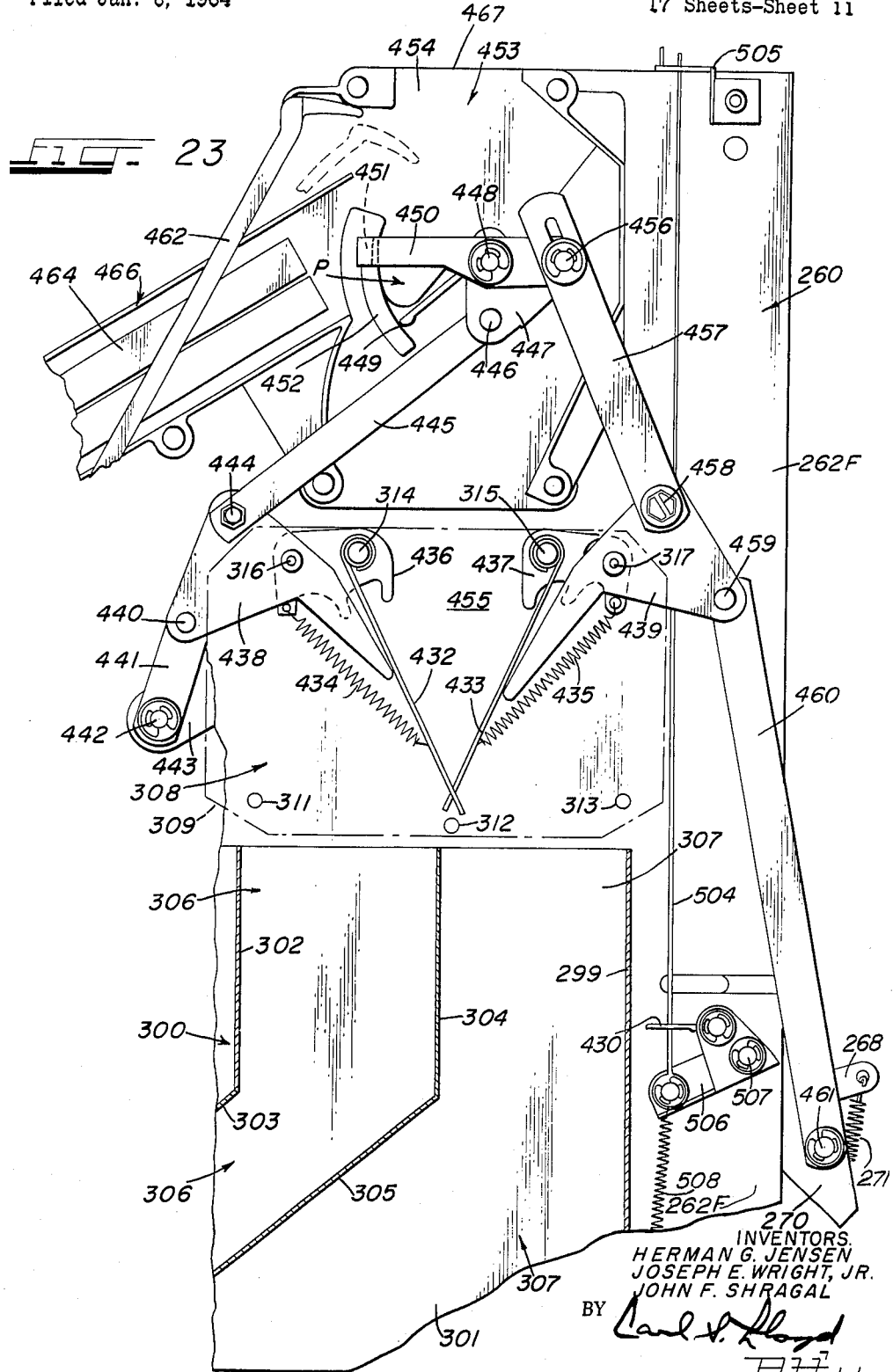

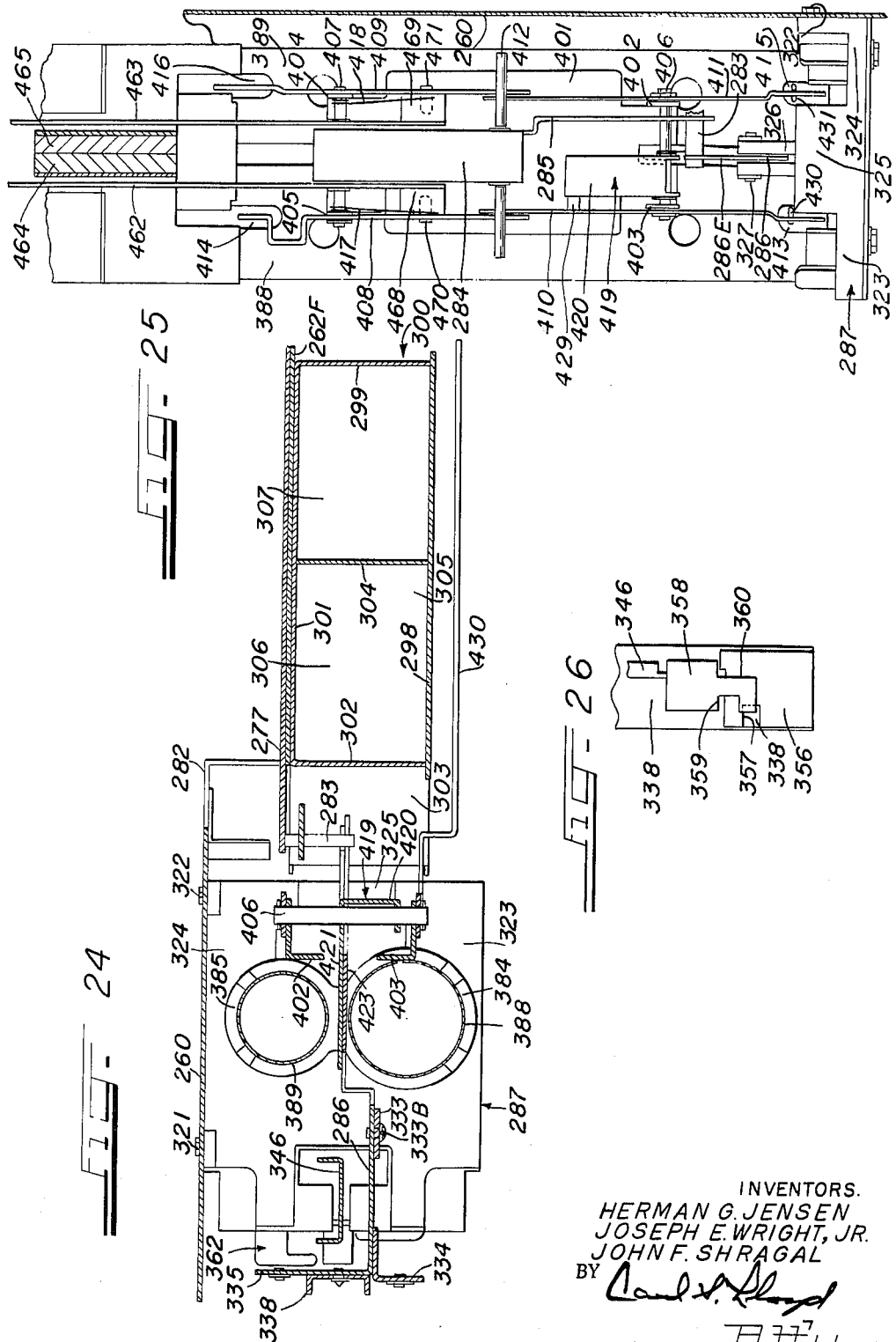

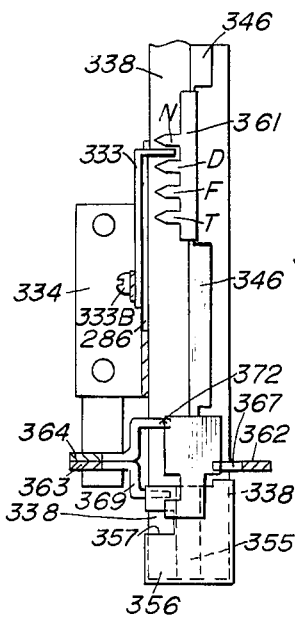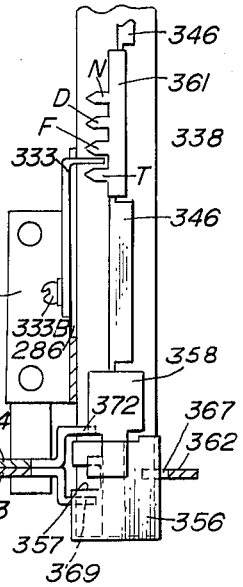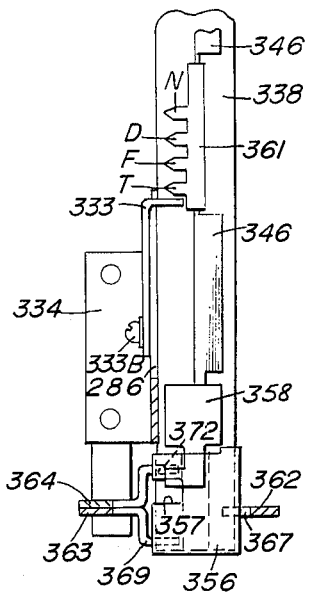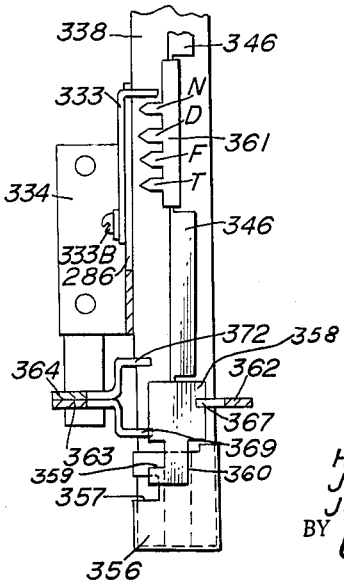

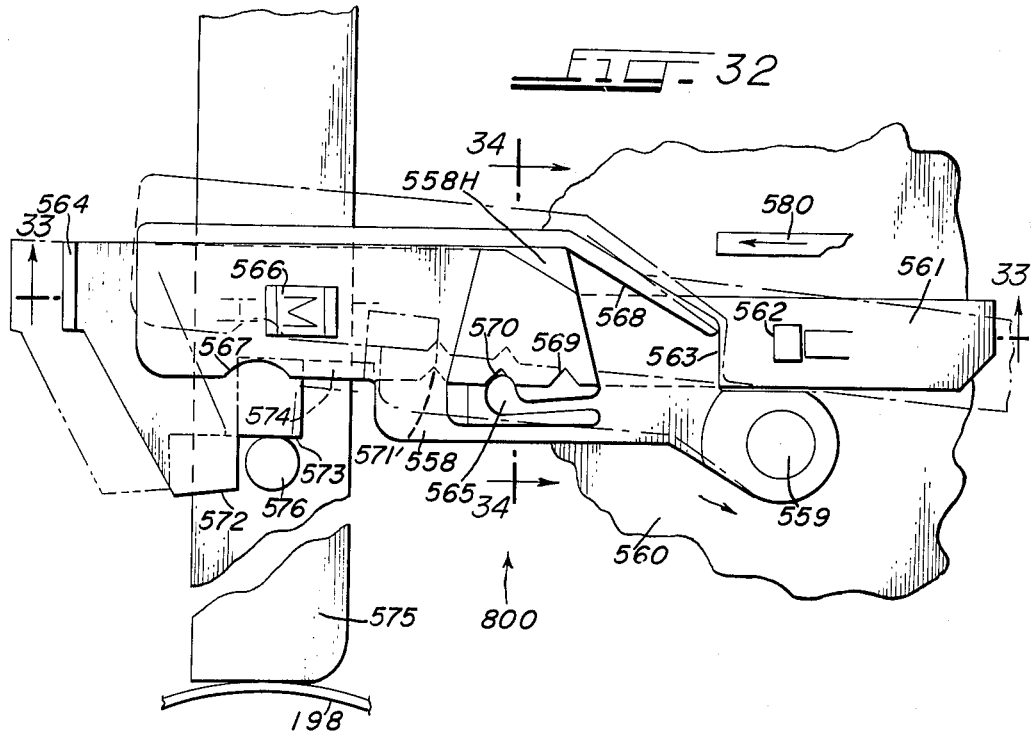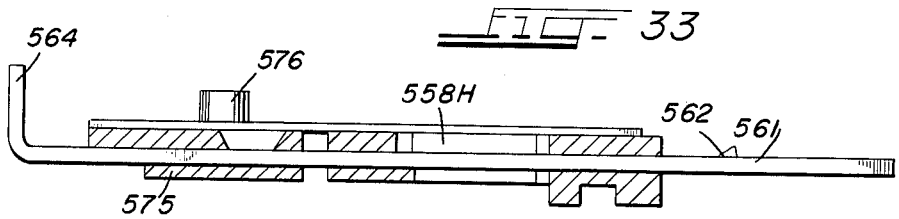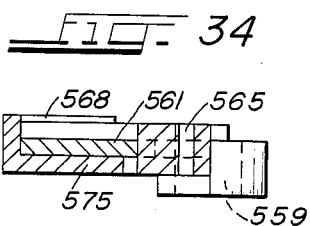

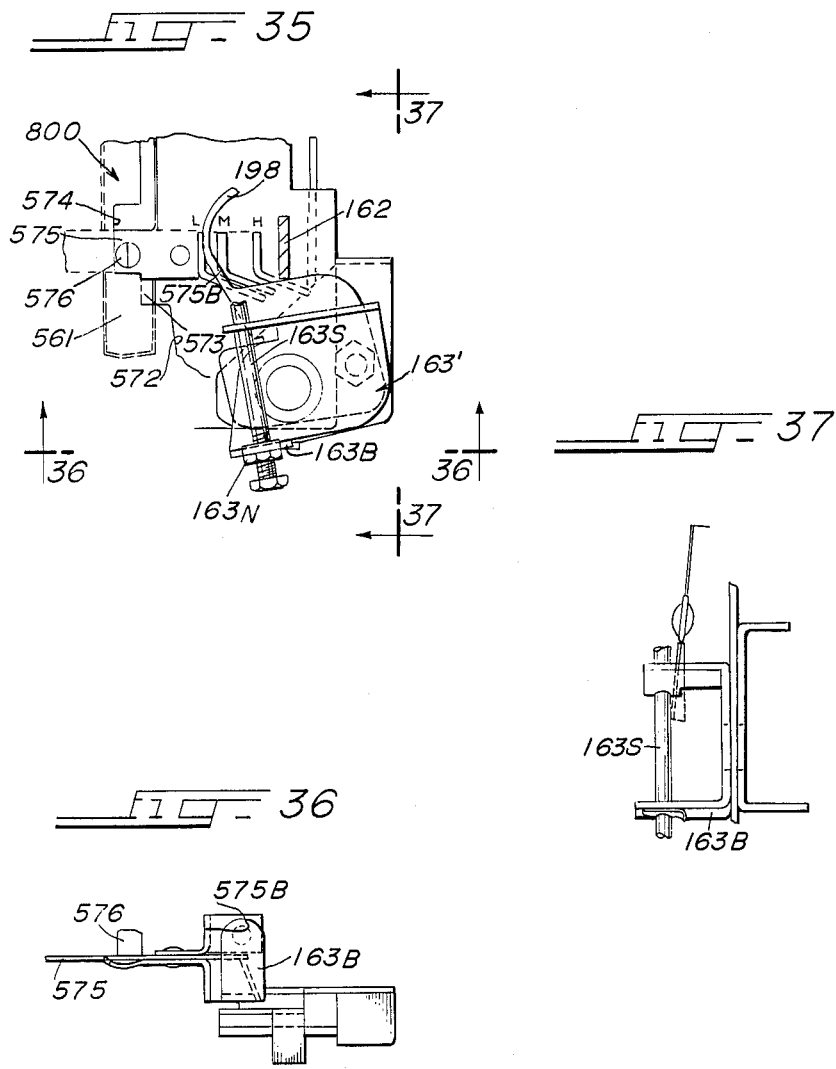

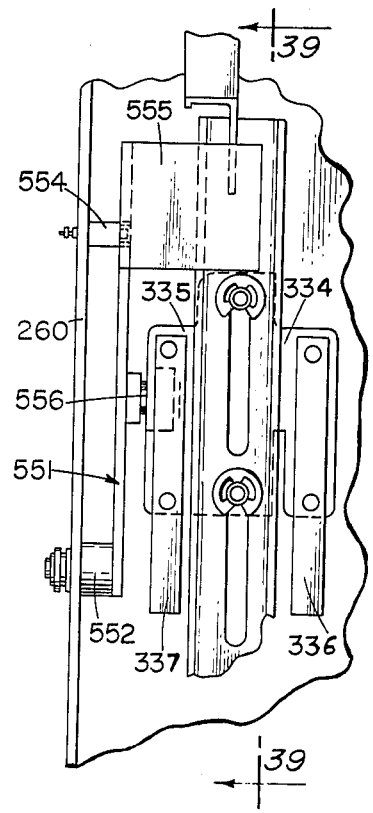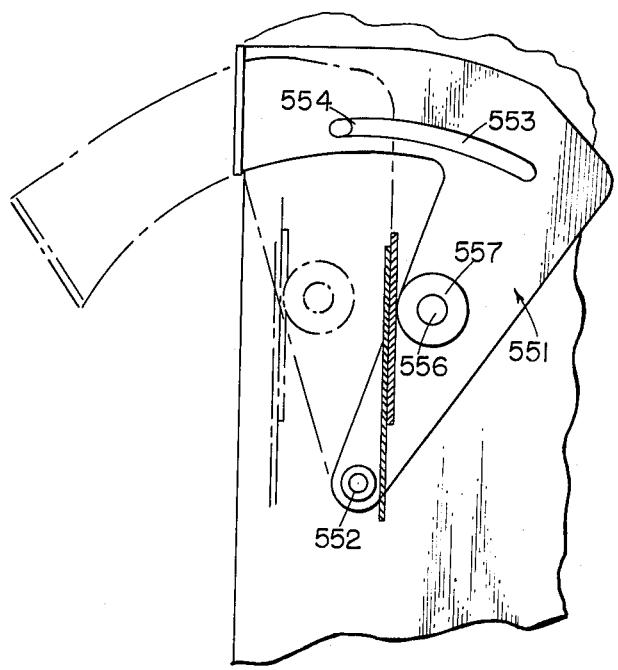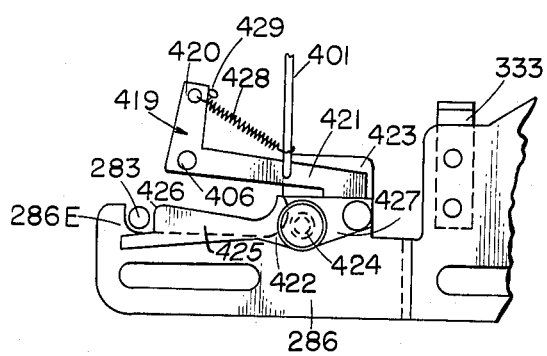

July 19, 1966  H. G. JENSEN ETAL  3,261,443
PRICE, CREDIT, AND CHANGE SENSING APPARATUS
FOR COIN-RESPONSIVE EQUIPMENT
Filed Jan. 6, 1964  17 Sheets—Sheet 17

INVENTORS.
HERMAN G. JENSEN
JOSEPH E. WRIGHT, JR.
JOHN F. SHRAGAL
BY
ATTY.

United States Patent Office 3,261,443
Patented July 19, 1966

3,261,443
PRICE, CREDIT, AND CHANGE SENSING APPARATUS FOR COIN-RESPONSIVE EQUIPMENT
Herman G. Jensen, Chicago, Joseph E. Wright, Jr., Wheaton, and John F. Shragal, River Grove, Ill., assignors to The Seeburg Corporation, Chicago, Ill., a corporation of Delaware
Filed Jan. 6, 1964, Ser. No. 335,714
45 Claims. (Cl. 194—80)

This invention relates to price, credit, and change sensing apparatus and more particularly to such apparatus adapted for use in equipment which vends in response to coins received therein.

The embodiment of the invention described herein comprises in general displaceable credit sensing means; credit value means responsive to the credit value of deposited coins; means for moving the credit sensing means into engagement with the credit value means; price sensing means; variable price level means responsive to one of a plurality of predetermined priced levels for coaction with the price sensing means; resultant change level means; changer means actuated by the resultant change level means; and means responsive to the credit value established by coaction of the credit sensing means and the credit value means, to the price value established by coaction of the price sensing means and the variable price level means, and to the change value established by coaction of the resultant change level means and the changer means for dispensing change as required in accordance with the selected price and credit values sensed by the apparatus. In the described embodiment, movement of the credit sensing means in effect determines the established credit value vis-a-vis the predetermined price value (which is established for a selected article by coaction of the price sensing means and the variable price level means), and further movement of the credit sensing means (indicating the establishment of a credit value in excess of the predetermined price value) serves to activate the resultant change level means and changer means for dispensing change from the mechanism as required. Within the framework of this overall combination, particular features of the invention are as follows. The indicated variable price level means comprises a selector tab mechanism (e.g., a series of selectively movable price determinative tab keys which form a variable pricing unit) which is adapted, in the described embodiment, for three settings of low, medium, and high price values (such as five cents, twenty-five cents, and fifty cents, or any three values of consecutive five cent increments between a five cent and a fifty cent value). A price selector assembly (e.g., a cam actuated slide) is provided for each item of merchandise dispensed by the vending mechanism, and each such assembly may be correlated to low, medium, and high price positions (the precise monetary values of which are determined by the selector tab mechanism) for coaction with the selector tab mechanism and the pricing sensing means (e.g., a price sensing slide) for establishing a price level for each vending cycle of operation. The credit sensing means (e.g., a credit slide) in turn operates in conjunction with the credit value means (e.g., a rotating credit wheel) to allow completion of a vend cycle (as by rack and pinion drive through a mechanical credit lock-out arrangement) and to determine the position of the resultant change level means (e.g., a change level slide). The resultant change level means in turn cooperates with the changer means (e.g., coin tubes having a unique coin slide extraction arrangement associated therewith) to dispense any change required by the price and credit values sensed during the operation.

Further, linkage means are provided for the cooperative sensing action of the price, credit, and change values.

Latching means are associated with the linkage means for assuring the proper functioning of the linkage means during the indicated sensing operations. Also, the changer means are provided in the form of coin tubes having unique coin entry, storage, and depletion arrangements for cooperation with the resultant change level means, which arrangements include a manual filling and sorting chute and a resilient base mounting for the coin tubes to assure proper reception and dispensation of coin change by the previously mentioned coin slide extraction arrangement. Escrow means are also provided for cooperation with the changer means and with a conventional cash deposit box. The escrow means are operated by the price, credit, and change sensing operations so that deposit of coins to a conventional cash box, replenishing of the coin supply of the changer means, and coin return upon erasure of credit can be accomplished as required. The escrow means are further provided with a unique snap-action anti-cheating arrangement in the form of an over-center escrow gate.

It is an object of this invention to provide an accurate and reliable price, credit, and change sensing mechanism adapted for determining credit values in response to deposited coins, for measuring the price of a selected article, and for allowing the vending of a selected article and the dispensation of change, if any, occasioned by the indicated difference between the determined credit and the measured price.

It is another object of this invention to provide a price sensing arrangement by which any one of the various items contained in a coin-responsive vending arrangemet may be correlated to any one of several price levels (such as high, medium, and low price levels) and by which the price levels may be correlated to any one of several selectively predetermined price values (such as any of the consecutive increments between a five cent and a fifty cent price value).

It is still another object of this invention to provide unique coin slide extraction means for selectively removing various combinations of coins from coin storage tubes associated with the extraction means.

Additional objects of the invention include the provision of a resultant change dispensing arrangement for dispensing change as required from coin tubes, which arrangement is characterized by: manual replenishing and depletion characteristics for the coin tubes, as required; automatic replenishing characteristics for the coin tubes by means of coins received in an escrow unit; the provision of a resilient base support in the coin tubes so that the replenishing and depletion of coins therefrom may be satisfactorily accomplished; and the provision of an over-center snap-action safety gate in the escrow unit so as to obviate cheating of the coin-responsive vending mechanism.

These and other objects, advantages, and features of the subject invention will hereinafter appear, and, for purposes of illustration, but not of limitation, an exemplary embodiment of the subject invention is shown in the appended drawings, in which:

FIGURE 1 is a front elevational view of a coin-responsive vending mechanism produced in accordance with the subject invention;

FIGURE 2 is a view similar to FIGURE 1, but wherein the coin rejector and credit mechanism and the coin changer and escrow mechanism are removed in order to reveal details of the price and credit sensing mechanism;

FIGURE 4 is a rear elevational view of the coin changer and escrow mechanism which was removed from FIGURE 1 in order to present the showing of FIGURE 2;

FIGURE 5 is a schematic illustration of portions of the coin-responsive vending mechanism, showing the vend drive cycle and the receipt of coins through a coin deposit sequence;

FIGURE 6 is a view similar to FIGURE 5, showing the coin return arrangement for deposited coins;

FIGURE 7 is a schematic illustration of the linkage utilized in the price and credit sensing mechanism;

FIGURE 8 is an enlarged side elevational view of a price selector tab mechanism;

FIGURE 9 is a front view of the structure shown in FIGURE 8;

FIGURE 10 is a top plan view, partially in section, of the structure shown in FIGURE 8;

FIGURE 11 is a side sectional view taken along the line 11—11 of FIGURE 10;

Figure 41:
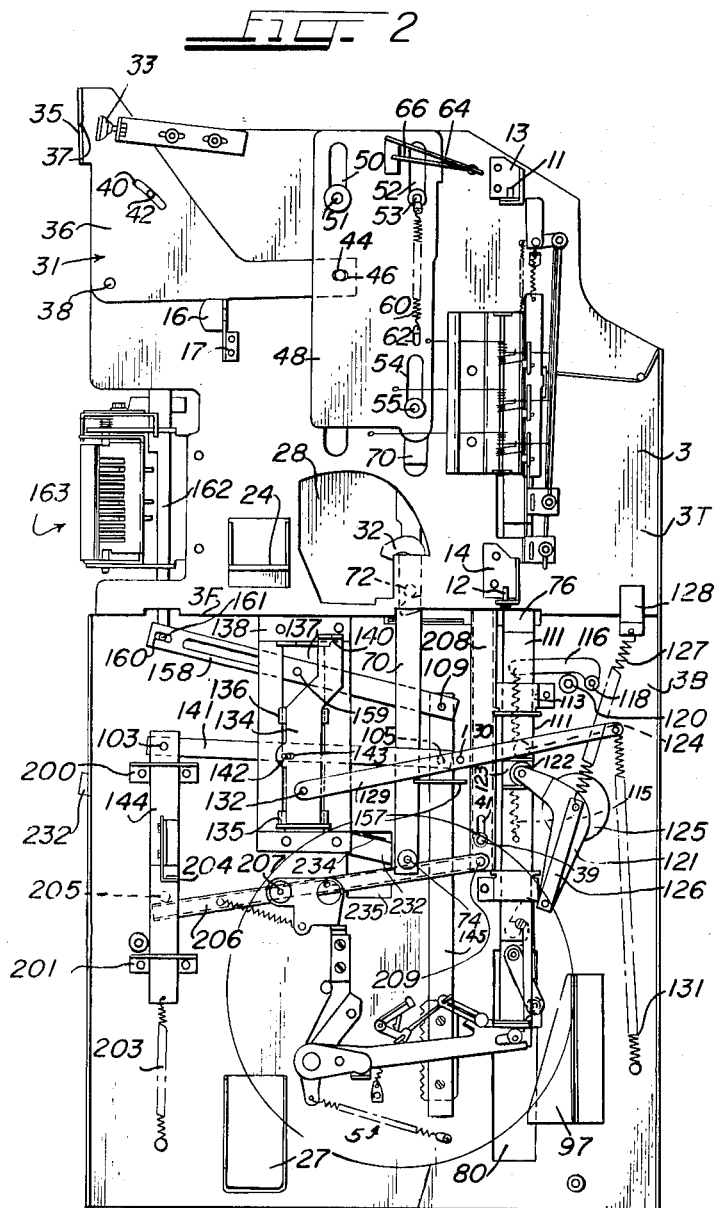
Figure 3:
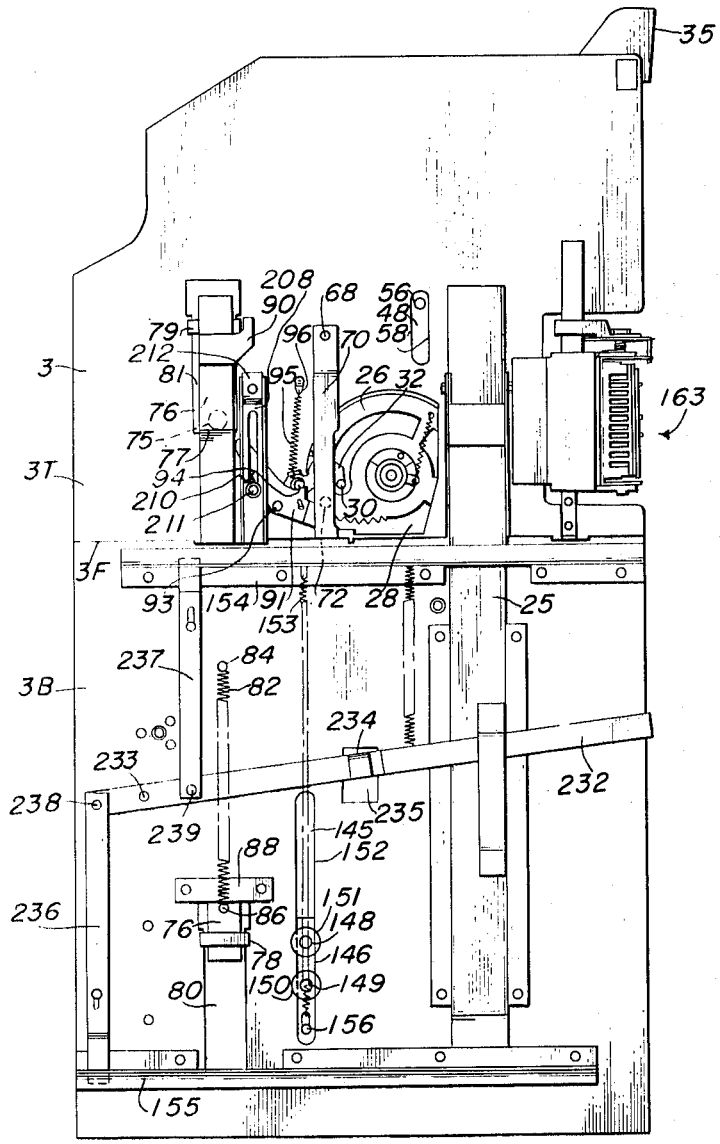
FIGURE 3 is a rear elevational view of the structure shown in FIGURE 1.
Figure 41:
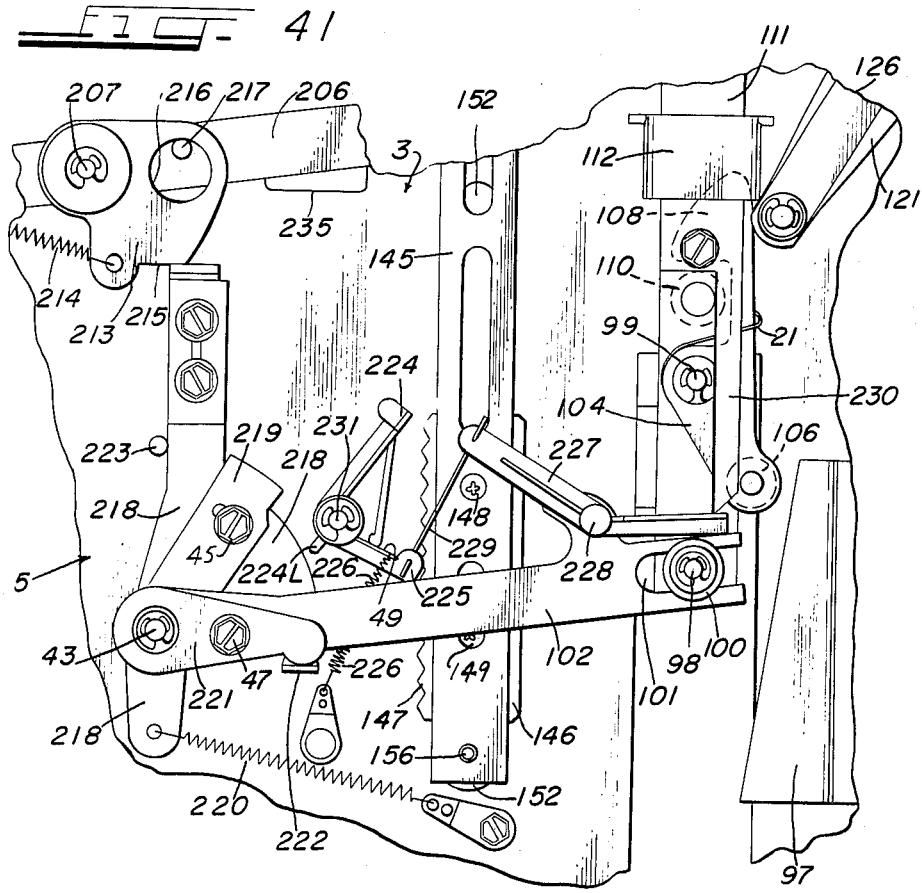
Figure 42:
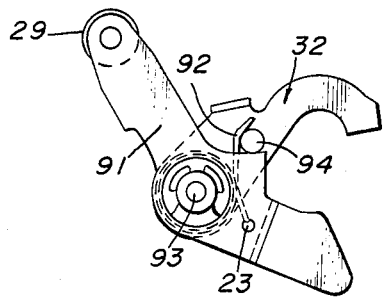

FIGURES 12, 13, and 14 are respectively plan views of the low, medium, and high price tab keys which are utilized in the structure shown in FIGURE 8;

FIGURE 15 is an enlarged fragmentary view of a portion of the coin changer and escrow mechanism shown in the lower left hand corner of FIGURE 1;

FIGURE 16 is a fragmentary bottom plan view of the structure shown in FIGURE 15;

FIGURE 17 is a fragmentary side elevational view of the structure shown in FIGURE 15;

FIGURE 18 is a sectional view taken along the line 18—18 of FIGURE 15;

FIGURE 19 is a sectional view taken along the line 19—19 of FIGURE 17;

FIGURE 20 is a schematic illustration of portions of the coin-responsive vending mechanism, showing the coin flag and coin block-out subassemblies;

FIGURE 21 is an enlarged fragmentary elevational view of the coin block-out subassembly;

FIGURE 22 is a side elevational view, partially in section, taken along the line 22—22 of FIGURE 21;

FIGURE 23 is an enlarged fragmentary view of a further portion of the coin changer and escrow mechanism, with certain parts removed for clarity;

FIGURE 24 is a sectional view taken along the line 24—24 of FIGURE 15;

FIGURE 25 is a sectional view taken along the line 25—25 of FIGURE 15;

FIGURE 26 is an enlarged fragmentary elevational view of the slide engaging members of the coin changer and escrow mechanism;

FIGURES 27–31 are fragmentary elevational views generally similar to FIGURE 27 and showing by partial sectional representations five, ten, fifteen, twenty, and zero cent change levels, respectively, as well as the corresponding positions of the coin slide at the indicated change levels;

FIGURE 32 is a schematic plan view of a price level selector assembly for determining any one of three given price levels for a column of merchandise contained in a vending unit, with the medium price level being shown in full lines, and with the low and the high price levels being shown respectively in double dash and in single dash lines;

FIGURE 33 is a sectional view taken along the line 33—33 of FIGURE 32;

FIGURE 34 is a sectional view taken along the line 34—34 of FIGURE 32;

FIGURE 35 is a top plan view of an anti-overshoot modification for the price level selector assembly;

FIGURE 36 is a front elevational view taken along the line 36—36 of FIGURE 35;

FIGURE 37 is a side elevational view taken along the line 37—37 of FIGURE 35;

FIGURE 38 is a fragmentary side elevational view, similar to FIGURE 17, showing an additional feature of the invention;

FIGURE 39 is a sectional view taken along the line 39—39 of FIGURE 38;

FIGURE 40 is an enlarged elevational view of a trigger mechanism for a changer slide contained in the coin changer and escrow mechanism;

FIGURE 41 is an enlarged front elevational view of a portion of the mechanism shown in FIGURE 2; and FIGURE 42 is an enlarged detail view of the credit subtracting lever shown in FIGURE 3.

With reference to the drawings, FIGURE 1 shows a front elevational view of the main portions of a coin-responsive vending mechanism 1 produced in accordance with the subject invention. In the described embodiment, the mechanism 1 comprises three major subassemblies, namely, the coin rejector and credit mechanism 2; a price and credit sensing mechanism 4; and a coin changer and escrow mechanism 6. These three major subassemblies are inter-operative in the manner hereinafter described.

The coin rejector and credit mechanism 2 may take the form of a conventional and commercially available coin rejector and credit accumulator, such as the combined package manufactured by National Rejectors, Inc., St. Louis, Missouri, model No. 1–15–105–MVQ slug rejector and model No. 13–01–000 credit accumulator. The mechanism 2 is schematically illustrated in the drawings and will be described in detail herein only to the extent necessary to inter-relate the functioning thereof with the arrangements and elements which constitute the subject invention, that is, the internal components of the coin rejector and credit mechanism 2 which sense coin values, reject slug and bent coins, and establish credit values will not be described herein, for purposes of clarity. Basically, therefore, the coin rejector and credit mechanism 2 is represented in the drawings (see FIGURES 1 and 6) as comprising a credit accumulator system 7 and a coin and slug rejector system 8, which are suitably interconnected to form one composite unit through which a coin C may pass (see FIGURE 6).

The coin rejector and credit mechanism 2 is provided with upper and lower brackets 9 and 10 respectively, which brackets are mounted respectively upon the stud 11 of the support bracket 13 and the stud 12 of the support bracket 14, the said brackets 13 and 14 being affixed to a main frame 3 of the price and credit sensing mechanism 4. The coin and slug rejector system 8 is also provided with a latching stud 15 which is adapted for placement in a spring latch 16 secured to the main frame 3 by a spring latch mounting bracket 17. In this manner, the coin rejector and credit mechanism 2 may be pivoted toward and away from the main frame 3 and may be securely interlocked therewith by virtue of the interacation of the spring latch 16 and the latching stud 15.

The coin and slug rejector system 8 is also provided with a coin cup 18 which can receive a coin C which is inserted into a coin slot aperture 20 and which then passes through a coin drop chute 22 into the coin cup 18 (see FIGURE 6). The coin C then passes through the coin and slug rejector system 8 which will reject bent coins and slugs into the mouth 24 of a coin reject chute 25, through which the rejected coin or slug will then travel for passage out of the coin responsive vending mechanism 1 via the exit port 27 of the coin reject chute 24 (see FIGURES 2 and 3). If, however, the coin is satisfactory, it is passed through the credit accumulator system 7, wherein credit values are sensed, registered, and recorded by rotation of a credit wheel 26 (see FIGURES 3 and 7). An opening 28 is provided in the main frame 3 to provide clearance for movement of portions of the credit wheel 26 (see FIGURE 3). A reset lever 30, which is a part of the conventional mechanism of the credit accumulator system 7, may be actuated so as to reset the credit accumulator wheel 26 to a zero or no value credit setting. In the arrangement shown in the drawings, the reset lever 30 is actuated to remove an established credit as registered on the credit accumulator wheel 26 by appropriate movement of a credit subtracting lever 32

(shown in FIGURE 42), in a manner hereinafter described.

A coin return arrangement 31 is provided attached to the main frame 3 of the price and credit sensing mechanism 4. The arrangement 31 comprises a coin return knob 34 which is located on the exterior of a vending machine equipped with the coin responsive vending mechanism 1 and which bears against a flange 35 of a coin return lever 36. The lever 36 is attached to the main frame 3 by a pivot stud 38 and by a guide stud 42 which rides in the arcuate slot 40 of the lever 36. A pin 44, which is carried at an extreme end of the coin return lever 36, is received in an aperture 46 of a coin scavenger slide 48. The slide 48 is provided with three elongated slots 50, 52, and 54, which are mounted on fixed bearing pins 51, 53, and 55, respectively, by suitable retaining rings, the said bearing pins being affixed to the main frame 3. A pin 56 also extends from the rear side of the scavenger slide 48 and is positioned within an elongated slot 58 provided in the main frame 3 (see FIGURE 3). A spring 60 is connected between the bearing pin 53 and a mounting bracket 62 carried by the slide 48. A scavenger lever 70 is connected to the scavenger slide 48 by the pin 68 (see FIGURE 3). The lever 70 carries a roller 72 intermediate its ends (shown in phantom in FIGURES 2 and 3) and a roller 74 adjacent its lower end (see FIGURE 2). The roller 72 is positioned adjacent the credit subtracting lever 32 (shown in detail in FIGURE 42) and is adapted to actuate the same (so as in turn to reset the credit accumulator wheel 26 by movement of the reset lever 30) when the lever 70 is moved downwardly. Similarly, the roller 74 interacts with the coin changer and escrow mechanism 6, in a manner hereinafter described, so as to provide for the return of deposited coins.

A spring deflector 66 is attached to a mounting bracket 64 which is carried by the scavenger slide 48. When the coin return lever 36 is rotated about the pivot stud 38 (to the right in FIGURE 2), the coin scavenger slide 48 is urged downwardly, thereby to move the scavenger lever 70 downwardly. The downward movement of the coin scavenger slide 48 causes the spring deflector 66 to engage mechanism in the coin and slug rejector system 8 which causes that mechanism to reject any coins passing through the coin and slug rejector system 8. This is an anti-cheating feature which insures that credit will not be established while the coin responsive vending mechanism 1 is in a coin returning operation. A further anti-cheating feature is provided by means of a suction cup 33 (see FIGURES 1 and 2) which is mounted in the path of movement of the coin return lever 36 so as to engage broadside the flange 35 thereof. The flange 35 is provided with an air bleed notch 37 in the impact zone adjacent the suction cup 33. In this manner, when the coin return lever is rotated clockwise (as shown in FIGURE 2), the flange 35 engages the suction cup 33, and, even when the coin return knob 34 is returned to its normal rest position (as by a spring return mechanism, not shown), the coin return lever 36 will be detained in its coin return clockwise position for a momentary delay (until the air bleed notch 37 effects a release of the flange 35 from the suction cup 33). This time delay arrangement insures that all coins contained in the coin changer and escrow mechanism 6 will be forced out of the system upon a coin return signal. Otherwise, it would be possible for a user of the machine to manipulate the coin return knob 34 in such a manner as to cause a deposited coin to maintain a coin return disposition in the coin changer and escrow mechanism 6, in a manner hereinafter described.

The price and credit sensing mechanism 4 comprises a main drive slide 76 which is mounted for reciprocable movement relative to the main frame 3 by a lower slide bearing 78 riding in a lower opening 80 and by an upper slide bearing 79 riding in an upper opening 81 of the main frame 3 (see FIGURE 3). A spring 82 is connected between a stud 84 on the main frame 3 and a stud 86 carried by the main drive slide 76. The spring 82 normally urges the main drive slide 76 to the upward position shown in FIGURE 3, wherein the stud 86 bears against a stop plate 88 which is affixed to the main frame 3. An offset 77 is provided in the main drive slide 76, and a roller 75 (shown in dash in FIGURE 3) rests upon the offset 77, such that downward movement of the roller 75 urges the main drive slide 76 downwardly against the action of the spring 82.

As the main drive slide 76 is thus moved downwardly, a cam member 90, which is attached to the upper end thereof, bears against a roller 29 carried at the end of an actuating lever 91 which is affixed for pivotal movement on the main frame 3 about the pivot pin 93 (see FIGURES 3 and 42). The credit subtracting lever 32, previously mentioned, is also pivoted about the pivot pin 93, and the actuating lever 91 and the credit subtracting lever 32 are interconnected by a spring wire link 92 which is fixed about a stud 94 carried by the credit subtracting lever 32 and which is received within an aperture 23 in the actuating lever 91. A spring 95 is connected at one end to a mounting bracket 96 affixed to the main frame 3 and at the other end to the credit subtracting lever 32. In this manner, the said downward movement of the main drive slide 76 causes engagement of the cam member 90 with the roller 29 such that the actuating lever 91 is rotated clockwise (as shown in FIGURE 3), whereby the credit subtracting lever 32 rotates downwardly against the action of the spring 95 so as to move the reset lever 30 and thereby to reset the credit accumulator wheel 26 to a zero or no credit value position.

The main drive slide 76 is provided with a pin 98 adjacent its lower end and with a pin 99 just above the said lower end (see FIGURE 41). A U-shaped slot 101 adjacent the end of a lever 102 surrounds the pin 98, and a roller 100 is mounted on the pin 98 so as to sandwich the U-shaped slot 101 between the end of the main drive slide 76 and the roller 100. The roller 100 cooperates with the coin changer and escrow mechanism 6, in a manner hereinafter described.

A latch member 104 is pivotally connected to the pin 99. The latch member 104 is provided with a roller 106 adjacent its one end and with a hook edge portion 108 (shown in dash in FIGURE 41) adjacent its other end. The latch member 104 is biased by a spring 21 to a counterclockwise position (relative to its FIGURE 41 disposition). The upper edge of the hook edge portion 108 engages a roller 110 (shown in dash in FIGURE 41), which is carried at the lower end of a sensing drive slide 111. The sensing drive slide 111 is mounted by the lower and upper mounting brackets 112 and 113 respectively for reciprocable movement relative to the main frame 3 in a plane parallel to the plane of movement of the main drive slide 76. A sensing drive slide spring 115 (shown in dash in FIGURE 2) is connected at its one end to a stud 114 carried by the sensing drive slide 111 and at its other end to a recoil lever 116, which is pivotally connected to the main frame 3 by a pivot pin 118. The recoil lever 116 is urged by the spring 115 to bear against a stud 120 positioned on the main frame 3, while the same spring 115 normally urges the sensing device slide 111 upwardly.

A roller 122 is affixed to the end of a bell crank member 121, which is mounted for pivotal movement relative to the main frame 3 by the support plate 125 (the pivoted connection being obscured in the FIGURE 2 view). The roller 122 is carried in a channel piece 123 which is affixed to the sensing drive slide 111. A link 126 is connected between one end of the bell crank lever 121 and one end of a spring 127, and the opposite end of the spring 127 is attached to a mounting bracket 128 affixed to the main frame 3 (see FIGURE 2).

In this fashion, as the main drive slide 76 is urged downwardly, the inter-latching arrangement between the latch member 104 and the sensing drive slide 111 causes the sensing drive slide 111 to also move downwardly against the action of the sensing drive slide spring 115. This mutual inter-latched downward movement continues until the roller 106 of the latch member 104 impedes against the sloping surface of a cam plate 97, which is affixed to the main frame 3. The latch member 104 is then rotated in a clockwise direction (relative to its FIGURE 41 disposition), thereby releasing the sensing drive slide 111, which then moves upwardly under the influence of the sensing drive slide spring 115. It should be observed that, as the sensing drive slide 111 moves downwardly under the influence of the downward movement of the main drive slide 76, the spring 127 actually aids the downward movement once the channel piece 123 moves downwardly so as to rotate the bell crank 121 in a counterclockwise manner, thereby allowing the spring 127 to further aid in the counterclockwise rotation of the bell crank member 121 via the link 126.

A main sensing arm 129 (see FIGURE 2) is pivotally connected to the main frame 3 by a centrally disposed pivot pin 130. A main sensing arm spring 131 is connected at one end to the main frame 3 and at its other end to the right hand end of the main sensing arm 129 (as shown in FIGURE 2). A roller 124 (shown in dash in FIGURE 2), which is attached to the main sensing arm 129, is urged by the spring 131 against the uppermost portion of the channel piece 123 of the sensing drive slide 111. A pivot pin 132 interconnects the left hand end of the main sensing arm 129 with a credit sensing slide 134.

The credit sensing slide 134 is mounted in an opening 137 of a generally U-shaped mounting bracket 138 affixed to the main frame 3. The slide 134 is mounted for reciprocable movement in the opening 137 by the lower and lower slide bearings 135 and 136 respectively. A credit sensing flange 140 is provided at the uppermost extreme of the credit sensing slide 134.

In this manner, downward movement of the main drive slide 76 and therefore of the interlatched sensing drive slide 111 allows a clockwise pivoting of the main sensing arm 129 under the influence of the spring 131, which action urges the credit sensing slide 134 upwardly.

A changer actuator lever 141 (see FIGURE 2) is connected to the credit sensing slide 134 in the following manner. A pin 142 carried by the changer actuator lever 141 is received in an elongated slot 143 of the credit sensing slide 134. The changer actuator lever 141 is pivotally connected at its left hand end to the uppermost extreme of a changer lift lever 144 by a pin 103. The changer actuator lever 141 is connected at its right hand end with an upper intermediate portion of a pivot slide 145 by a pin 105 (shown in dash in FIGURE 2).

The pivot slide 145 is mounted for reciprocable movement relative to the main frame 3 as follows. A ratchet bearing member 146 is connected to the lower end of the pivot slide 145. The ratchet bearing member 146 is provided with ratchet teeth 147, for a purpose hereinafter described. Bolts 148 and 149 (see FIGURE 41) connect the ratchet bearing member 146 to the lower end of the pivot slide 145. The bolts 148 and 149 also carry respectively the retaining washers 150 and 151 on the rear side of the main frame 3. In this manner, the pivot slide 145 is enabled to reciprocablly move within an elongated opening 152 provided in the main frame 3. A spring 153, one end of which is connected to an upper flange extension 154 of the main frame 3 and the other end of which is affixed to a stud 156 carried by the lower end of the pivot slide 145, normally urges the pivot slide 145 away from its lowermost position as shown in FIGURES 2, 3, and 41. The pivot slide 145 is also carried by a mounting bracket 157 affixed to the main frame 3 (see FIGURE 2).

The upper end of the pivot slide 145 is connected to the right hand end of a price selector lever 158 by a pin 109 (see FIGURE 2). The price selector lever 158 is mounted for pivotal movement relative to the main frame 3 by a centrally disposed pin 159. An elongated slot 160 provided in the left hand end of the price selector lever 158 receives a pin 161 which is carried at the lower end of a price sensing lever 162.

The changer lift lever 144, the upper end of which is connected to the left hand end of the changer actuator lever 141 by the pin 103, is mounted for reciprocable movement relative to the main frame 3 by the upper and lower mounting brackets 200 and 201, respectively, through which the changer lift lever 144 passes. A changer lift lever spring 203 is connected at one end to the main frame 3 and at the other end to the lower end of the changer lift lever 144, thereby to normally urge the changer lift lever 144 downwardly to the position shown in FIGURE 2. An L-shaped extension 204 is provided on the uppermost surface of the changer lift lever 144 to cooperate with the coin changer and escrow mechanism 6, in a manner hereinafter described. A stud 205 (shown in dash in FIGURE 2) is provided on the interior side of the changer lift lever 144 and acts as a stop for pivotal movement of a credit lock-out pivot lever 206.

The credit lock-out pivot lever 206 is mounted for pivotal movement relative to the main frame 3 by a pivot pin 207, and the left hand end of the pivot lever 206 bears against the stud 205, while the right hand end of the pivot lever 206 is connected to the lowermost portion of a credit lock-out slide 208 by a pin 209. The credit lock-out slide 208 is mounted for reciprocable movement relative to the main frame 3, as by the interengagement of a pin 39 which is secured to the main frame 3 and which is received in an elongated slot 41 provided in the credit lock-out slide 208. The credit lockout slide 208 functions to allow completion of a vend cycle, in a manner hereinafter described, when the changer lift lever 144 is moved upwardly, via clockwise rotation of the pivot lever 206, as shown in FIGURE 2. The upper end of the credit lock-out slide 208, which is shown in FIGURE 3, is provided with an elongated slot 210, which receives a pin 211 affixed by the main frame 3. A bearing member 212 is provided at the uppermost portion of the credit lock-out slide 208 for a purpose hereinafter described.

A latch cam 213 is also pivotally mounted on the pivot pin 207 in superimposed relationship relative to the credit lock-out pivot lever 206 (see FIGURES 2 and 41). The latch cam 213 is provided with a cam face 215 and with a circular aperture 216 which surrounds a stud 217 carried by the credit lock-out pivot 206. A spring 214 is connected between the credit lock-out pivot lever 206 and the latch cam 213 so as to normally urge the latch cam 213 to an extreme position of clockwise rotation, as shown in FIGURES 2 and 41.

A latching subassembly 5 (see FIGURES 2 and 41) is affixed to the main frame 3 and cooperates with previously described elements. The latching subassembly 5 comprises a latch 218 which is affixed to a pivot pin 43 for pivotal movement relative to the main frame 3. The latch 218 normally prevents rotation of the credit lock-out pivot lever 206, but, when the latch member 218 is rotated clockwise, in a manner hereinafter described, the lever 206 is freed for rotation. A spring 220 is connected at its one end to the lowermost extreme of the latch 218 and at its other end to the main frame 3, so that the latch 218 is normally urged to a rest position of abutment against a stud 223 affixed to the main frame 3. A trigger 219 is also pivotally mounted on the pin 43 and is affixed by a bolt 45 to the latch 218 for pivotal rotation therewith. The lever 102, previously described, is also pivoted on the pin 43, and a lever rider 221, which is affixed to the lever 102 by a bolt 47, is likewise mounted for pivotal movement on the pivot pin 43. A finger extension 222 is provided on the latch 218 adjacent the right hand end of the lever rider 221, whereby clockwise rotation of the lever 102 causes clockwise rotation of the latch 218 and its associated trigger 219 (relative to the FIGURE 41 disposition).

A latching pawl 224 is mounted for pivotal movement relative to the main frame 3 by a pivot pin 231. A latching pawl stop member 225 is also mounted for pivotal movement on the pivot pin 231. A spring 226, which is connected at its one end to an extension 49 of the latching pawl 224 and at its other end to the main frame 3, normally urges the latching pawl 224 to an extreme clockwise position (relative to its FIGURE 41 disposition) whereby the unpivoted end of the latching pawl 224 bears against the ratchet teeth 147 carried by the pivot slide 145, as shown in FIGURE 41. A pivot member 227 is mounted for pivotal movement on the lever 102 by a centrally disposed pivot pin 228. A link 229 interconnects the latching pawl stop member 225 and the left hand end of the pivot member 227. The right hand end of the pivot member 227 engages an extension 230 provided on the sensing drive slide 111.

Thus, by reference to FIGURES 2 and 41, it will be seen that, as the main drive slide 76 moves downwardly, the lever 102 is caused to rotate clockwise about the pivot pin 43. This rotation of the lever 102 causes the attached pivot member 227 to also rotate relative to the pivot pin 43, whereby the right hand end of the pivot member 227 (which is pivotally mounted on the lever 102 by means of the pivot pin 228) bears upwardly against the extension 230 of the sensing drive slide 111, and the left hand end of the pivot member 227 bears downwardly so as to urge the latching pawl stop member 225 to rotate clockwise about its pivot pin 231. This movement of the stop member 225 allows the spring 226 to urge the latching pawl 224 into engagement with the ratchet teeth 147 of the pivot slide 145. The pivot slide 145 may then move upwardly as the spring-loaded latching pawl 224 drags past the ratchet teeth 147, but is prevented from downward movement by virtue of the indicated engagement of the ratchet pawl 224 with the ratchet teeth 147. The pivot slide 145 may thereby be maintained in a given position of upward movement so that the linkage arrangement of the price and credit sensing mechanism 4 may operate, in a manner hereinafter described.

However, as the main drive slide 76 continues its downward movement, the lever 102 is eventually rotated by a sufficient degree in a clockwise direction such that the trigger 219 carried by the lever 102 (via the latch 218) engages an extreme left hand end 224L of the latching pawl 224 (i.e., a left hand end extension to the left of the pivot pin 231 as shown in FIGURE 41), thereby to rotate the latching pawl 224 counterclockwise out of engagement with the ratchet teeth 147 and to allow the downward return movement of the pivot slide 145 (by virtue of the resultant spring force derived from the spring 115 associated with the sensing drive slide 111). The described release of the latching pawl 224 from the ratchet teeth 147 is timed to occur just prior to the release of the sensing drive slide 111 from the latch member 104. As previously described, the release of the latch member 104 allows the sensing drive slide 111 to move upwardly, and this upward movement of the sensing drive slide 111 causes the credit sensing slide 134 to move downwardly via the induced rotation of the main sensing arm 129 (see FIGURES 2 and 7). As soon as the credit sensing slide 134 is thus moved downwardly, the cam action of the cam member 90 (affixed to the main drive slide 76, see FIGURE 3) with the actuating lever 91 causes the credit subtracting lever 32 to reset the credit accumulator wheel 26. Thus, the credit sensing flange 140 of the credit sensing slide 134 is withdrawn from the vicinity of the credit accumulator wheel 26 during the resetting thereof. It should be noted that it is necessary to release the pivot slide 145 for downward movement since the credit sensing slide 134 cannot move downwardly if the pivot slide 145 is locked from downward movement (due to the interconnecting changer actuator lever 141). From the foregoing, it should be apparent that the latching subassembly 5 performs the functions of maintaining the pivot slide 145 in a given position of upward movement and of thereafter releasing the pivot slide 145 for downward movement just prior to the resetting of the credit accumultor wheel 26.

Also, in case a vend cycle has not been completed, i.e., in case the main drive slide 76 has not moved completely downwardly so as to engage the trigger 219 with the extreme left hand end 224L of the latching pawl 224, thereby to release the latching pawl 224 from the ratchet teeth 147 of the pivot slide 145, means are provided to release the latching pawl 224 from the ratchet teeth 147 independently, in order to enable a return of the mechanism to its rest disposition. These means, which comprise the pivot member 227, the link 229, and the latching pawl stop member 225, operate as follows. If the main drive slide 76 is moved only partially downwardly and is then reversed for upward movement prior to a release of the sensing drive slide 111, it will be observed that the main drive slide 76 will move upwardly relative to the sensing drive slide 111 until the bottom edge of the hook portion 108 of the latch member 104 engages the roller 110 of the sensing drive slide 111. When the described engagement is effected, the sensing drive slide 111 will then move upwardly conjointly with the main drive slide 76. However, the slight relative movement of the main drive slide 76 relative to the sensing drive slide 111 (by virtue of the movement of the roller 110 of the sensing drive slide 111 from engagement with the upper edge of the hook portion 108 to the lower edge thereof) will cause the extension 230 of the sensing drive slide 111 to urge the pivot member 227 to rotate clockwise about its pivot pin 228. This rotation of the pivot member 227, along with the generally upward movement of the pivot pin 228 itself as the lever 102 moves upwardly with the main drive slide 76, will urge the latching pawl stop member 225 to rotate counterclockwise due to the interengagement of the pivot member 227 and the latching pawl stop member 225 via the link 229. This movement of the latching pawl stop member 225 causes a corresponding counterclockwise rotation of the latching pawl 224 relative to its pivot pin 231 such that the latching pawl 224 is withdrawn from engagement with the ratchet teeth 147 of the pivot slide 145.

A release lever 232 (see FIGURE 3) is pivotally mounted on the rear side of the main frame 3 by the pivot pin 233. The release lever 232 is provided with a spring tab extension 234 which extends through a window 235 provided in the main frame 3 (see FIGURES 2, 3 and 41). An upper placement slide 237 is mounted for reciprocable movement on the main frame 3 and is connected to the release leved 232 by a pin 239. Similarly, a lower placement slide 236 is affixed to the release lever 232 by a pin 238. The extreme portions of the placement slides 236 and 237 extend respectively into lower and upper flange extensions 155 and 154 of the main frame 3 (as shown in dash in FIGURE 3). These extreme portions are designed to interlock into means provided on the frame of a vending unit (not shown), whereby the main frame 3 may be positioned within a vending unit and may be released therefrom by appropriate manipulation of the release lever 232.

It should also be observed that clockwise rotation of the release lever 232, as shown in FIGURE 3, causes a clockwise rotation of the credit lock-out pivot 206 as the spring tab extension 234 is impressed thereupon, as shown in FIGURE 2, so that the credit lock-out slide 208 may move downwardly to insure proper alignment of the various components attached to the main frame 3 when the said frame is inserted into a vending unit. Once the main frame 3 is mounted by the described interaction of the extreme portions of the placement slides 236 and 237, the release lever 232 performs no function in the actual vending operations. The latch cam 213, by virtue of its circular aperture 216, allows the described temporary clockwise rotation of the credit lock-out pivot lever 206, since the lever 206 may rotate clockwise as the stud 217 carried thereby traverses the circular aperture 216. However, if the latch 218 were directly positioned adjacent the credit lock-out pivot lever 206, this temporary rotation of the lever 206 could not be effected without some corresponding provision for removal of the latch 218 from its cooperative alignment with the lever 206.

The actuating means for effecting the previously described downward movement of the main drive slide 76 is shown in FIGURES 5 and 7. A vend knob 240 is provided for exterior positioning on a vending unit (not shown). The knob 240 is connected to a vend plate 241 disposed in the interior of the vending unit. A crank 242 is pivotably mounted on the plate 241 and a drive rack 243 is secured to the crank 242, as best seen in FIGURE 5. In this manner, a pull force exerted on the vend knob 240, in the direction of the arrow shown in FIGURE 5, will cause a corresponding movement of the crank 242 and the drive rack 243 to the phantom positions shown in FIGURE 5. The drive rack 243, which is provided with ratchet teeth 248, thereby rotates a ratchet wheel 244, which in turn engages ratchet teeth 245 provided on a ratchet drive slide 246, and the ratchet drive slide 246 is thereby moved vertically downward. A roller 75 is affixed to the lower end of the ratchet drive slide 246, and the roller 75, as previously described, engages an offset 77 provided in the main drive slide 76 so as to force the main drive slide 76 downwardly (the roller 75 is shown in dash in FIGURE 3).

A credit lock-out bar 249 (see FIGURE 7) is positioned in the path of movement of the drive rack 243. A limit bracket 250, which is provided with an L-flange extension 255, is positioned adjacent the credit lock-out bar 249, for a purpose hereinafter described. A tab extention 251 of the credit lock-out bar 249 extends through a window slot 252 provided in the drive rack 243. The credit lock-out bar 249 is also provided with a restricted intermediate portion 256. A pawl 253, which is normally urged against the credit lock-out bar 249 by a spring 254, forces the credit lock-out bar 249 to a normal rest position wherein the lowermost extreme of the credit lock-out bar 249 rests upon the bearing member 212 (see FIGURE 3) provided at the uppermost extreme of the credit lock-out slide 208. In this position, the drive rack 243 is blocked from movement (to the left in FIGURES 5 and 7) by the credit lock-out bar 249. When, however, the credit lock-out slide 208 is moved downwardly (as by clockwise rotation of the credit lock-out pivot lever 206, as previously described), gravity and the induced force of the pawl 253 urge the credit lock-out bar 249 downwardly such that the restricted intermediate portion 256 thereof lines up with the L-flange extension 255 of the limit bracket 250 so that the drive rack 243 may achieve the described left hand movement. The limit bracket 250 serves to prevent a smashing or breakage of the credit lock-out bar 249 should the drive rack 243 be impounded thereagainst in a futile effort to move the drive rack 243 by an applied force on the vend knob 240 at anytime when the credit lock-out slide 208 has not moved downwardly to allow completion of a vend cycle.

The price selector tab mechanism 163, shown in FIGURES 1–3, is illustrated in detail in FIGURES 8–14. A price selector tab mechanism housing 164 is connected to the main frame 3 by bolts 165 and 166 (see FIGURE 8). The housing 164 comprises an upper wall 167, a lower wall 168, a rear wall 169, and a side wall 170. A shaft 171 is carried by the upper wall 167 and lower wall 168 and is retained thereon by the retaining rings 180 and 181.

A slotted trough 172 is mounted on the shaft 171. The trough 172 comprises a rear wall 173, an upper flange 174, a lower flange 175, a front flange 176, and a rear flange 177. Flange extensions 178 and 179 are provided on the front and rear flanges 176 and 177 respectively. A price selector grid 182 is mounted on the slotted trough 172 and extends across the face thereof to encompass the flange extensions 178 and 179 (as shown in FIGURES 9 and 10). The price selector grid 182 is provided with a serrated window 185, as best seen in FIGURE 9. The window 185 is defined by a series of rectangular extensions 186 on either side of the price selector grid 182. The rectangular extensions 186 define a series of slots 187 on either side of the price selector grid 182, which slots conform to coin values, as hereinafter described, such as the nickel through half dollar five cent incremental values shown in FIGURE 9. The rear wall 173 of the slotted trough 172 is provided with a similar series of slots 188 (see FIGURE 11) coresponding in one-by-one variation to the slots 187 of the price selector grid 182. In similar fashion, the rear flange 177 and the front flange 176 of the slotted trough 172 are provided with corresponding series of slots 189 areas respectively.

A bolt 183 is connected to the flange extension 178 of the slotted trough 172 and passes through the price selector grid 182. An adjusting nut 184 is threaded onto the bolt 183 such that the price selector grid 182 may be securely clamped to the flange extensions 178 and 179 of the slotted trough 172. In this manner, the price selector grid 182 may be shifted axially with respect to the shaft 171 such that the slots 187 of the price selector grid 182 may be either in alignment with or out of alignment with the corresponding series of slots 188, 189, and 190 of the slotted trough 172.

A series of tab key elements are mounted for axial movement on the shaft 171. In the described embodiment, three tab key elements 191, 192, and 193 are provided, and each are respectively illustrated in FIGURES 12, 13, and 14. Each tab key has a generally similar configuration and comprises a front tab selector portion A, side wing retaining portions B and C on either side of the tab key, a central elongated aperture E, and a stop portion D. These respective portions A–E are labeled 191A–E, 192A–E, and 193A–E in FIGURES 12, 13, and 14, respectively. As shown in FIGURE 10, the stop portions D of each tab key are of increasing proportions, that is, the stop portion 191D presents the smallest cross-sectional area, whereas the stop portions 192D and 193D have relatively larger cross-sectional areas respectively.

A pivot lever 194 is rotatively mounted on the shaft 171 above the upper wall 167 of the price selector tab mechanism housing 164. The pivot lever 194 is provided with a downwardly extending stop portion 195 and with a downwardly extending flange 196. The flange 196 is received within a slot provided in the upper flange 174 of the slotted trough 172 so that rotation of the pivot lever 194 will effect a corresponding rotation of the slotted trough 172. A torsion spring 197 is connected at its one end to the flange 196 and at its other end to the upper wall 167 of the housing 164 so that the pivot lever is normally urged to a rest position wherein the stop portion 195 of the pivot lever 194 bears against the upper wall 167 of the housing 164. An actuating lever 198 is affixed to the pivot lever 194 and is similarly mounted for pivotal movement on the shaft 171 by the bolt 119 which secures a planar portion 199 of the actuating lever 198 to the uppermost portion of the pivot lever 194. In this manner, the normal rest position for the price selector tab mechanism 163 will be that shown in FIGURES 8–11. When a force is impressed against the actuating lever 198 (as in the direction of the arrow in FIGURE 9), the actuating lever 198 will rotate (to the right in FIGURE 9 and clockwise in FIGURE 10) until impeded by the price sensing lever 162. This rotation of the actuating lever 198 causes a corresponding rotation of the pivot lever 194 and of the slotted trough 172 interconnected therewith by the flange 196.

The price sensing lever 162 is provided with an extended flange portion 257 (see FIGURES 8 and 11) in the vicinity of the price selector tab mechanism 163. The extended flange portion 257 will serve to impede downward movement of the price sensing lever 162 whenever the said flange portion 257 engages any of the stop portions 191–193D. Thus, when the price selector tab mechanism 163 is in its normal or rest position as shown in FIGURES 8–11, the price sensing lever 162 can move downwardly until the extended flange portion 257 is impeded by engagement with the stop portion 191D of the uppermost tab key 191. However, if the price selector tab mechanism is slightly rotated (again, to the right in FIGURE 9 and clockwise in FIGURE 10) by a force impressed in the direction of the arrow shown in FIGURE 9, the price sensing lever 162 will be able to move downwardly until the extended flange portion 257 is impeded by the stop portion 192D of the intermediate tab key 192. In a similar fashion, when the price selector tab mechanism is rotated even further, the price sensing lever 162 will be able to move downwardly to its extreme position wherein the extended flange portion 257 is impeded by the stop portion 193D of the lowermost tab key 193.

It should be observed that the described predetermined extent of movement of the price sensing lever 162 may be controlled as desired by appropriate positioning of the tab keys 191–193 in any of the several slots 187 provided on the price selector grid 182. In the illustrated embodiment, it is seen that the uppermost tab key 191 is arbitrarily positioned at a fifteen cent price level, while the intermediate tab key 192 is positioned at a twenty-five cent price level, and the lowermost tab key 193 is positioned at a thirty-five cent price level. These levels may be altered as desired whereby any given predetermined high, medium, and low price values may be sensed by movement of the price sensing lever 162.

In order to alter the price levels shown in the drawings, an operator need only loosen the bolt 184 so as to release the price selector grid 182. The grid 182 may then be aligned, as shown in the drawings, with the slotted trough 172 such that the slots 187 of the grid 182 are in line with the aligned slots 188, 189, and 190 of the trough 172. Any or all of the tab keys 191–193 may then be grasped by the respective tab selector portions A and pulled partially outwardly from the price selector tab mechanism 163 (to the left in FIGURES 8 and 11). When the tab keys 191–193 have been so orientated they may be axially displaced on a shaft 171 until a desired new setting is reached, whereupon the operation is reversed and the tab keys 191–193 are reinserted into the desired slots corresponding to the desired price level. The price selector grid 182 is then shifted downwardly (from its position shown in FIGURE 9) to disalign the grid 182 and the trough 172, and the bolt 184 is tightened to clamp the grid 182 into stationary engagement with the slotted trough 172, whereby the keys 191–193 are retained in the desired setting.

The coin changer and escrow mechanism 6 comprises various components supported on either side of a frame 260, which is secured to the main frame 3 by the bolts 318, 319, and 320 (see FIGURE 1). The frame 260 comprises an innermost front face 261F, an outermost front face 262F, and a front face offset 263F therebetween. Correspondingly, the frame 260 is provided with an innermost rear face 261R, an outermost rear face 262R, and a rear face offset 263R (see FIGURE 4). A slot 264 is provided in the frame 260 (see FIGURE 4), and this slot 264 receives an exit port 27 of the coin rejector chute 25, previously described.

An L-bar lever 265 is pivotally mounted on the frame 260 by the pivot pin 266 (see FIGURE 4). A cam latch crank 268 is also pivotally mounted on the frame 260 by a pivot pin 267. A roller 269 (shown in dash in FIGURE 4) is mounted on the side of the L-bar lever 265 which faces the outermost rear face 262R of the frame 260. This roller 269 rides upon a finger extension 272 of the cam latch crank 268, while an oppositely extending finger extension 273 is connected to one end of a spring 274, the opposite end of which is connected to the rear face offset 263R of the frame 260. A U-shaped crank 270 is also pivotally mounted on the pivot pin 267, and a spring 271 interconnects the U-shaped crank 270 and the cam latch crank 268. The U-shaped crank 270 is provided with an elongated slot 275, which receives a stud 276 carried at the extreme end of a changer actuator slide 277. The slide 277 is mounted for reciprocable movement on the frame 260 by the interconnection of the bearing studs 279 and 281 within the respective elongated slots 278 and 280. An L-shaped window 282 is provided in the frame 260, and an end of the changer actuator slide 277 extends therein (see FIGURE 4).

A pin 283 is provided on the extreme end of the changer actuator slide 277 which extends into the window 282. The pin 283 connects to the lowermost end of a lever extension arm 285 which is an integral extension of a U-shaped lever 284 (see FIGURES 1, 15 and 40). The pin 283 also bears against an upward extension 286E of a changer slide 286, which is mounted for horizontal reciprocable movement on a changer tube housing 287 which is affixed to the frame 260 by bolts 321 and 322 (see FIGURE 4).

As shown in FIGURES 15–19, 24, and 25, the changer tube housing 287 comprises an elevated nickel slide chamber 323 and a depressed dime slide chamber 324. An elevated right central block 325 (see FIGURE 25) overlaps and partially separates the chambers 323 and 324. A bearing yoke 326 is positioned on top of the central block 325, and the changer slide 286, which is provided with an elongated slot 331 (see FIGURES 1 and 15), is mounted on the bearing yoke 326 by a pin 327 which passes through the yoke 326 and the elongated slot 331 (see FIGURES 15 and 25).

The changer tube housing 287 is also provided with an elevated left central block 328 (see FIGURES 15 and 18) which supports a bearing yoke 329. A pin 330 passes through the bearing yoke 329 and through an elongated slot 332 (see FIGURES 1 and 15) of the changer slide 286, such that the slide 286 is mounted for horizontal reciprocating movement relative to the changer tube housing 287.

An L-bar guide 333 is affixed to the changer slide 286 by a bolt 333B (see FIGURES 15, 18, and 27–31). Extending flanges 334 and 335 extend on either side of the changer slide 286, and spring metal tab fingers 336 and 337 extend respectively from the flanges 334 and 335. The flange 335 is an integral extension of the slide 286, whereas the flange 334 is affixed thereto by a rivet 334R (see FIGURE 15).

A captive slide 338, which is provided with elongated slots 339 and 340 (see FIGURE 17), is mounted on bearing pins 341 and 342 of the changer slide 286, such that the captive slide 338 may reciprocate vertically relative to the changer slide 286. A guide bar 343 (see FIGURES 1, 15, and 18) extends perpendicularly from the captive slide 338. The guide bar 343 is provided with an elongated slot 344 which receives a bearing pin 345 mounted on a change level slide 346. The change level slide 346 is provided with elongated slots 347 and 348. The slot 347 receives the pin 330 (which is the same pin which mounts the changer slide 286 to the bearing yoke 329 of the changer tube housing 287), and the slot 348 receives a pin 349 which is affixed to the frame 260, such that the change level slide 346 may reciprocate vertically relative to the frame 260.

A spring latch 250 (see FIGURES 1, 15, 17 and 18) is pivotally connected to the upper most end of the change level slide 346. The latch 350 is mounted on a pin 351 which extends from the upper end of the change level slide 346, and a torsion spring 352 normally urges the latch 350 toward the change level slide 346 (counterclockwise in FIGURE 15). The spring latch 350 is provided with a curved finger extension 353 which engages the uppermost end of the captive slide 338, and the latch 350 is also provided with an arcuate slot 354 which receives the L-shaped extension 204 of the changer lift lever 144 (shown in FIGURE 2). A portion of the extension 204 is schematically shown in FIGURE 18 as engaged in the arcuate slot 354.

The captive slide 338 is provided with a block member 355 riveted to its lower end. A slide engaging member 256 is provided as an integral extension of the block member 355 (see FIGURES 16, 19, and 26–31). A slot 357 is provided in the slide engaging member 356, as best seen in FIGURES 26–31. A slide engaging member 358 is also provided on the lower end of the change level slide 346 (see FIGURES 16, 19, and 26–31). The slide engaging member 358 is provided with a slot 359 and with an L-shaped cutaway portion 360, as best seen in FIGURE 26.

The change level slide 346 is also provided with a change level lock member 361 which is secured to a central portion of the change level slide 346 (see FIGURES 15, 18, and 27–31). The change level lock member 361 is provided with perpendicularly extending flanges N, D, F, and T, which flanges cooperate with the L-bar guide 333 in a manner hereinafter described.

The changer tube housing 287 contains a dime slide 362 in the dime slide chamber 324 and further contains a first nickel slide 363 and a second nickel slide 364 in the nickel slide chamber 323 (see FIGURES 16, 18, 19, and 27–31). The dime slide 362 is provided with a cut-out aperture 362D, which aperture is slightly larger in area than a United States dime. Similarly, the nickel slides 363 and 364 are each provided with cutaway apertures 363N and 364N respectively, which apertures are slightly larger in area than a United States nickel.

The dime slide 362 is provided with an extension 365 (best seen in FIGURE 16), and the extension 365 is cutaway so as to define a right hand shoulder 366 and a left hand tab finger 367 (in accordance with the FIGURE 16 orientation). Similarly, the first nickel slide 363 is provided with an extension 368, which is cutaway to define a left tab finger 369 and a right tab finger 370, and the second nickel slide 364 is provided with a similar extension 371, which is cutaway to define a left tab finger 372 and a right tab finger 373 (the latter of which is seen in FIGURE 19).

A spring metal tube bottom 375 and a spring metal base plate 374 are secured to the changer tube housing 287 by the bolts 376 and 377 (see FIGURE 16). The tube bottom 375 is provided with arcuate cut-outs 378 and 379, generally corresponding to dime and nickel semicirculare areas respectively. The dime slide 362 and the nickel slides 363 and 364 are retained in the housing 287 by the base plate 374 and the tube bottom 375 and by overlapping washers 380 and 381, which are secured to the housing 287 by the bolts 382 and 383 respectively. The housing 287 is also provided with a generally circular opening in the form of a nickel changer tube support 384 and with a similar generally circular opening in the form of a dime changer tube support 385 (see FIGURES 15, 17, 19, and 24). The supports 384 and 385 are positioned in alignment with the nickel slides 363 and 364 and with the dime slide 362 respectively. Slots 387 (see FIGURE 19) are provided in each of the slides so that the reciprocable movement of the slides relative to the housing 287 will not be impeded by the bolts 376 and 377.

A nickel tube 388 is seated in the tube support 384, and similarly a dime tube 389 is seated in the tube support 385. The tubes 388 and 389 extend generally parallelly to each other in a vertical direction, and their respective top ends are received in an upper tube support mounting 390, which is provided with a manual fill slide 391 as an integral extension thereof (see FIGURES 1, 15, and 17). The manual fill slide 391 is provided with a centrally disposed dividing rib 392 (see FIGURE 17) which cooperates with upturned walls 393 and 394 on either side thereof to define a dime fill chute 395 and a nickel fill chute 396. The manual fill slide 391 is also provided with generally eliptical apertures 397 and 398 and with generally circular apertures 399 and 400, which perform the important functions of allowing jammed or lodged coins to be removed from the fill chutes 395 and 396. Also, the aperture 398 is dimensioned to allow passage of a nickel therethrough, but not of a dime or penny, or of other coins smaller than a nickel, in order that such coins might fall through the aperture 398 if they were slide down the nickel fill chute 396.

A support plate 401 (see FIGURES 1, 15, and 25), which is provided with lower inturned flanges 402 and 403 respectively and with upper inturned flanges 404 and 405 respectively, is mounted on the frame 260 above the changer tube housing 287 and immediately behind the changer tubes 388 and 389. A shaft pin 406 is carried by the flanges 402 and 403, and a shaft pin 407 is carried by the flanges 404 and 405. An upper nickel sensing lever 408 is pivotally mounted on one end of the shaft 407 adjacent the nickel changer tube 388, and similarly an upper dime sensing lever 409 is pivotally mounted on the opposite end of the shaft 407 adjacent the dime changer tube 389. A lower nickel sensing lever 410 is pivotally mounted on one end of the shaft 406 adjacent the nickel changer tube 388, and similarly a lower dime sensing lever 411 is pivotally mounted on the opposite end of the shaft 406 adjacent the dime changer tube 389. The closest ends of the nickel sensing levers 408 and 410 contiguously overlap, and similarly the closest ends of the dime sensing levers 409 and 411 contiguously overlap. A shaft 412, which is carried by the U-shaped lever 284 (previously described), is positioned adjacent the respective overlapping ends of the lever pairs 408–410 and 409–411.

Each of the sensing levers 408–411 is provided with an inturned end portion, such as the sensing portion 410S of the sensing lever 410, as illustrated in FIGURE 15. These inturned portions extend respectively into openings 413–416 provided at the tops and bottoms of the changer tubes 388 and 389 (see FIGURE 25). The levers 408 and 409 are provided respectively with torsion springs 417 and 418 which normally urge these levers to rotate (counterclockwise as shown in FIGURE 1) such that their end portions bear against the shaft 412 while their oppoiste end portions extend into the respective openings 414 and 416 of the tubes 388 and 389 respectively. Similarly, the lower ends of the sensing levers 410 and 411 are respectively connected to links 430 and 431, which, in a manner hereinafter described, normally urge these levers to rotate clockwise, as shown in FIGURE 1, such that their upper end portions bear against the shaft 412 while their sensing end portions are received in the respective openings 413 and 415 of the changer tubes 388 and 389 respectively.

An L-shaped trigger lever 419 (see FIGURES 25 and 40) is also pivotally mounted on the shaft 406 in between the sensing levers 410 and 411. The trigger lever 419 comprises a U-shaped leg 420 (shown in FIGURE 25) and an L-shaped leg 421 (see FIGURE 40). A pivot lever 422 is pivotally connected to an extension 423 of the changer slide 286 by a rivet 424. The pivot lever 422 comprises a long arm 425, which is cut away at its extreme end so as to define a shoulder 426, and a short arm 427, with the rivet 424 being disposed between the arms 425 and 427. A spring 428 is connected between the leg 420 of the trigger lever 419 and the support plate 401, such that the trigger lever 419 and the support plate 401, such that the trigger lever 419 is normally urged in a clockwise direction (as shown in FIGURE 40) so that the leg 421 of the trigger lever 419 tends to rotate the pivot lever 422 in a clockwise direction (as shown in FIGURE 40), whereby the shoulder 426 is positioned adjacent the pin 283. In this manner, horizontal movement of the pin 283 is translated into a corresponding horizontal movement of the changer slide 286.

A pin 429 (see FIGURES 25 and 40) is provided on the sensing lever 410 adjacent the leg 420 of the trigger lever 419, and this pin 429 will rotate the trigger lever 419 against the force of the spring 428 whenever the sensing lever 410 is in a position such that its lower sensing portion is received within the opening 413 of the changer tube 388. Thus, whenever the tube 388 is depleted of nickels (so that the sensing portion of the sensing lever 410 is received within the opening 413), the pivot lever 422 is withdrawn from the path of the pin 283, and movement of the pin 283 will not effect the corresponding movement of the slide 286. When, however, the nickel tube 388 is provided with a sufficient number of nickels therein such that the sensing end portion of the sensing lever 410 is prevented from positioning in its normal position within the nickel tube 388 (stated alternatively, such that the sensing lever 410 is rotated counterclockwise from its FIGURE 1 disposition such that the sensing end portion thereof is retracted from the opening 413 of the tube 388), the pivot lever 422 is appropriately rotated into the path of the pin 283 in order for the pin 283 to actuate the slide 286 for the desired reciprocating movement.

A generally L-shaped plate 288 (see FIGURES 1, 15, 16, and 18) is affixed to the frame 260 beneath the changer tube housing 287. The plate 288 comprises a first flange 289 which is secured to the front face 261F by a wing nut assembly 290. A sidewall 291 extends generally perpendicularly from the flange 289, and a V-trough 292 is provided in the sidewall 291. A front wall 293 extends from the sidewall 291 generally parallelly to the flange 289, and a sidewall 295 extends from the front wall 293 generally parallelly to the sidewall 291. A flange 296 completes the plate 288 and is secured by a wing nut assembly 297 to the top wall 298 of a return deposit chute chamber 300. The chamber 300 (see FIGURES 1, 5, 6, and 23) comprises a right sidewall 299, a rear wall 301, a left rear wall straight section 302, and a left rear wall inclined section 303. An internal panel straight section 304 and an internal panel inclined section 305 (see FIGURES 6 and 23) divide the chamber 300 into a coin return chute 306 and a coin deposit chute 307. The chamber 300 is of course affixed to the frame 260 by positioning of the rear wall 301 adjacent the outermost front face 262F, as best seen in FIGURE 23.

A coin escrow chamber 308 (see FIGURES 1, 5, 6, and 23) is affixed to the frame 260 above the return-deposit chute chamber 300. The escrow chamber 308 comprises a front wall 309 (shown in phantom in FIGURE 23) and a rear wall 310 (see FIGURE 6) which is congruous with and parallel to the front wall 309. Lower spacing bolts 311, 312, and 313 interconnect the front wall 309 and the rear wall 310 in spaced parallel relation, with the rear wall 310 being maintained adjacent the outermost front face 262F of the frame 260. The walls 309 and 310 are also spaced by a first set of interconnecting pins 314, 315 and a second set of interconnecting pins 316, 317.

In the interior of the coin escrow chamber 308, a coin return gate 432 and a coin deposit gate 433 are respectively pivotally connected to pins 314 and 315 (see FIGURE 23). A spring 434 is connected to the coin return gate 432 and to a spring support member 436 which is pivotally connected to the pins 314 and 316. Similarly, a spring 335 is connected to the coin deposit gate 433 and to a spring support member 437 which is pivotally connected to the pins 315 and 317. A coin return close lever 438 is also pivoted to the pin 316, and a coin deposit close lever 439 is similarly pivoted to the pin 317.

A link 445 is connected to the coin return close lever 438 by a bolt 444, and the opposite end of the link 445 is connected by a pin 446 to a coin return pivot lever 447. The lever 447 is pivotally connected to a pin 448 which is pressed into a coin receipt chamber 453 affixed to the frame 260. The coin return pivot lever 447 is provided with a blocking finger extension 449 which extends within the coin receipt chamber 453 toward a coin slide chute 466.

The coin receipt chamber 453 is divided into three separate chambers, namely, a nickel chamber, a dime chamber, and a quarter chamber, which are divided by walls parallelly aligned with a cover plate 453' (see FIGURE 1) which overlies the coin receipt chamber 453. In FIGURE 23, the cover plate 453' of the coin receipt chamber 453 is removed for clarity and the nickel chamber (indicated by 454) is revealed thereby. The dime chamber (not seen) is essentially identical to the nickel chamber 454 and is separated therefrom by a wall 467 (see FIGURE 23). The quarter chamber is immediately below the dime chamber, and, although not shown in the drawings, it comprises a hollow passage underlying the dime chamber whereby a quarter may be received from the coin rejector and credit mechanism 2 and may be passed immediately through the coin receipt chamber 453 into the escrow space 455 defined between the interlacing gates 432 and 433.

A coin holding lever 450 is also pivotally connected to the pin 448, and the lever 450 is provided with an inwardly extending finger 451 (shown in phantom in FIGURE 23) which traverses the depth of the nickel and dime chambers as the end portion of the finger 451 rides in a groove 452 provided in the interior wall 467 which separates the nickel and dime chambers.

A pin 456 interconnects the right hand end of the coin holding lever 450 with a link 457, and a spring (not shown) interconnects coin holding lever 450 and link 457 to normally bias lever 450 clockwise (relative to the FIGURE 23 disposition). The link 457 is also connected by a pin 458 to the coin deposit close lever 439. The coin deposit close lever 439 is in turn connected to a link 460 by a pin 459, and the link 460 is connected to the U-shaped crank 270 (previously described) by a pin 461.

The coin slide chute 466, which extends into the interior of the nickel and dime chambers, comprises two parallel slide chutes, namely, nickel slide chute 464 and a dime slide chute 465 (see FIGURES 23 and 25). A nickel full blocking lever 462 is pivotally connected to the shaft 407 adjacent the nickel tube 388, and similarly a dime full blocking lever 463 is pivotally connected to the shaft 407 adjacent the dime tube 389. The lowermost extreme of the nickel full blocking lever 462 is provided with a flange 468 which engages a pin 470 carried by the upper nickel sensing lever 408, and similarly the lowermost extreme of the dime full blocking lever 463 is provided with a flange 469 which engages a pin 471 carried by the upper dime sensing lever 409. Each of the blocking levers 462 and 463 are provided with arcuate end portions which extend into the respective nickel and dime chambers of the coin receipt chamber 453. The levers 462 and 463 are cantilever loaded such that they would normally rest as far clockwise as is possible (relative to the FIGURE 23 disposition), such as indicated by the phantom lines in FIGURE 23. However, so long as the upper sensing levers 408 and 409 assume their normal rest positions under the influence of the respective torsion springs 417 and 418 with the end portions of the respective levers 408 and 409 being received within the openings 414 and 416 respectively (see FIGURE 25) of the tubes 388 and 389 (i.e., the counterclockwise rotated position shown in FIGURE 1), the respective blocking levers 462 and 463 will be urged to the non-blocking position which is illustrated in FIGURES 1 and 23. When, however, the nickel tube 388 is sufficiently full of nickels such that the upper nickel sensing lever 408 is caused to rotate clockwise (relative to the FIGURE 1 disposition) so as to remove the sensing end portion thereof from the opening 414 of the tube 388, the nickel blocking lever 462 is caused to rotate in a clockwise direction (relative to the FIGURE 23 disposition) so as to assume the phantom line position shown in FIGURE 23. Similarly, a corresponding series of events occurs when the dime tube 389 is sufficiently full of dimes so as to cause the upper dime sensing lever 409 to activate the dime blocking lever 463. In this manner, coins received in the nickel and dime chambers of the coin receipt chamber 453 will be blocked from entering the appropriate slide chutes 464 and 465 whenever the respective tubes 388 and 389 are sufficiently full of coins therein.

The coin return close lever 438 is connected to a link 441 by a pin 440. The link 441 is in turn connected to a crank 443 by a pin 442. The crank 443 extends through a window 472 in the frame 260 (see FIGURE 4) and is pivotally connected by the pin 473 to a cross-shaped planar housing 474, which is secured to the innermost rear face 262R of the frame 260. A bolt 475 also secures the housing 474 to the frame 260. The housing 474 is provided with an upper perpendicular flange 476 and with a lower perpendicular flange 477.

A roller actuated crank 478 is pivotally connected to a pin 485 which is affixed to the housing 474. The crank 478 is provided with an upper perpendicular flange 479 and with a lower perpendicular flange 480 such that a roller may be received therebetween for actuation of the crank 478. A cam lever 481 is also pivotally connected to the pin 485 and is provided with a finger extension 482 to engage the crank 443. A spring 483 normally urges the crank 478 and the cam lever 481 into the contiguous embracing position shown in FIGURE 4.

An important feature of the described structure is the provision of an over-center spring 484 which interconnects the crank 478 and a pin 486 affixed to the crank 443. In its normal rest or non-operative position, the crank 478 is rotated counterclockwise from the position shown in FIGURE 4 such that the finger 482 of the cam lever 481 engages the crank 443 while the upper perpendicular flange 479 of the crank 478 bears against the upper perpendicular flange 476 of the housing 474. In this position, the spring 483 is distended as the crank 478 and the cam lever 481 are separated, and the over-center spring 484 is braced between the crank 478 and the crank 443.

The roller 74, which as previously described is carried at the lowermost extreme of the scavenger lever 70 (see FIGURE 2), is received between the flanges 479 and 480 of the crank 478. In this manner, when the scavenger lever 70 is depressed, the roller 74 depresses the crank 478 toward the cam lever 481 and then rotates the crank 478 and the cam lever 481 clockwise until the position shown in FIGURE 4 is reached. The crank 443 is then released from engagement with the finger 482 of the cam lever 481, and the over-center spring 484 drives the crank 443 counterclockwise (relative to the FIGURE 4 disposition). This movement of the crank 443 causes a clockwise movement of the return close lever 438 (relative to the FIGURE 23 disposition), whereby the spring 434 pulls the coin return gate 432 in a corresponding clockwise direction (relative to the FIGURE 23 disposition). In this manner, the position illustrated schematically in FIGURE 6 is achieved, whereby any coins retained within the escrow space 455 of the escrow chamber 308 are routed into the coin return chute 306 for eventual return to the customer.

It should be noted that an important advantage of the subject invention is achieved by the utilization of the over-center spring 484. By virtue of this member, it is for all practical purposes impossible to so jiggle the coin return knob 34 (see FIGURE 6) so as to freeze the coin return gate 432 in an opened or wedged-opened position such that deposited coins would be returned freely. Once the coin return gate 432 leaves its rest or in-operative position shown in FIGURE 23, the over-center spring 484 will insure that it opens completely, and conversely, once the gate 432 starts to close toward its rest position shown in FIGURE 2, the over-center spring 484 will insure that it closes completely with a rapid snapping action in either instance.

The corresponding actuation of the coin deposit gate 433 is schematically illustrated in FIGURE 5. In this instance, rotation of the crank 270 causes the coin deposit close lever 439 to rotate counterclockwise (relative to the FIGURE 23 disposition) via the drive imparted by the link 460. When the lever 439 so rotates, the spring 435 snaps the coin deposit gate 433 to the right such that the position schematically illustrated in FIGURE 5 is achieved, and any coins received in the coin escrow space 455 of the escrow chamber 308 will be routed into the coin deposit chute 407 for eventual receipt in a cash deposit box (not shown).

FIGURES 5 and 6 also schematically illustrate various other coin-handling events attendant to the coin return and the coin deposit sequences. For example, it will be observed that the normal disposition of the coin return gate 432 and the coin deposit gate 433 is in the interlacing relationship shown in FIGURE 23, whereby the escrow space 455 is defined therebetween. When a quarter coin is deposited into the coin responsive vending mechanism 1, as previously described, it will be received directly in the escrow space 455 as it passes through the quarter chamber of the coin receipt chamber 453. However, when either a nickel or a dime is correspondingly inserted into the mechanism, the said nickel or dime will be received in the nickel or dime chamber of the coin receipt chamber 453, and such a coin will fall into a pocket P (see FIGURE 23) defined by the blocking finger extension 449 and the coin holding lever 450, with its inwardly extending finger 451. Thereafter, any corresponding coin subsequently deposited will bounce off the retained coin (as indicated by the phantom arrows in FIGURE 5) and will proceed directly to the escrow space 455. In other words, any quarter deposited will be immediately positioned in the escrow space 455, whereas either the first nickel or the first dime deposited will be retained by the coin holding lever 450, while subsequent nickels or dimes which are deposited will bounce off the retained nickels or dimes, respectively, and will then be routed directly to the escrow space 455. The described coin fall paths are schematically indicated by the sequential reference letters C in FIGURES 5 and 6.

When a coin return signal is generated in the mechanism, actuation of the coin return gate 432 by the coin return lever 438 will correspondingly rotate the blocking finger extension 449, as the link 445 rotates the coin return pivot lever 447 (see FIGURE 23). In this manner, a quarter already positioned in the escrow space 455; a first nickel or dime which is retained in the pocket P; or a second nickel or dime which has bounced off the said first nickel or dime and has been positioned in the escrow space 455 would all fall into the coin return chute 306 of the return-deposit chute chamber 300 for eventual return to the customer. Similarly, when a coin deposit signal is generated in the mechanism, the coin deposit gate 433 is actuated by the close lever 439, which in turn induces rotation of the coin holding lever 450 via the link 457. In this manner, the nickel or dime which is retained in the pocket P by the coin holding lever 450 is allowed to fall into the appropriate nickel slide chute 464 or the dime slide chute 465, for eventual delivery to the respective changer tubes 388 and 389. Any other coins positioned in the escrow chamber 455 (such as quarters, or nickels or dimes which have bounced off the nickel or dime retained by the coin holding lever 450) are, as previously described, routed into the coin deposit chute 307 for eventual receipt in a cash deposit box (not shown). Therefore, it should be appreciated that the described arrangement provides a means for automatically replenishing the supply of coins in the coin chamber tubes by utilization of newly deposited coins, in the manner described.

It should be noted that the previously described spring (not shown) interconnecting the coin holding lever 450 and the link 457 functions to maintain the escrow feature of the described operation even though a given coin may be trapped by a fast upward movement of the lever 450 before the said given coin has had sufficient time to roll past the lever 450 and into the coin slide chute 466. If such trappage should occur, the coin deposit gate 433 and its associated linkage will be permitted to return to its rest disposition as shown in FIGURE 23 by virtue of the said spring; otherwise, the coin deposit gate 433 could be held opened and any moneys deposited into the escrow space 455 would immediately drop into the cash box so as to destroy the escrow function of the coin escrow chamber 308. The mechanism then functions to clear up the trappage of the retained coin on the next vending cycle when the coin holding lever 450 is again actuated.

The coin return and escrow mechanism 6 further comprises a coin flag subassembly 600 which cooperates with a coin block-out subassembly 700 which in turn cooperates with the coin rejector and credit mechanism 2 (see FIGURE 20). The coin flag subassembly 600 comprises a support housing 487 which is provided with a flange 488 and a pivot pin 489. A nickel crank 490 and a dime crank 491 are each pivotally mounted on a pin 528 which is affixed to the main frame 3. A nickel lever 492 and a dime lever 493 are each pivotally mounted on the pin 489 and their respective lowermost ends are engaged by the respective cranks 490 and 491. A nickel link 494 connects the uppermost end of the lever 492 to a coin flag assembly 496, and a dime link 495 similarly connects the upper end of the dime lever 493 to the coin flag assembly 496. Both of the links 494 and 495 are journaled in the flange 488, as seen in FIGURE 20. The coin flag assembly 496 comprises a flag assembly housing 498 which rotatably carries a rotating flag signal assembly 497 therein. Appropriate indicia are imprinted upon the rotating flag signal assembly 497, as hereinafter indicated.

A dime link 499 connects the crank 491 to a flange 501F of a dime slide 501, and similarly a nickel link 500 connects the crank 490 with a flange 502F of a nickel slide 502 (see FIGURES 21 and 22). A dime link 503, the upper end of which is detachably received in a slot 503S of the flange 501F, connects the slide 501 to a crank 509 (see FIGURE 4), which is pivotally mounted by a pin 510 on the innermost rear face 262R of the frame 260. Similarly, a nickel link 504, the upper end of which is detachably received in a slot 504S of the flange 502F, connects the slide 502 with a crank 506 (see FIGURES 1 and 23), which is pivotally mounted by a pin 507 on the outermost front face 262F of the frame 260. A bracket 505, which is connected to the frame 260, supports the links 503 and 504.

A spring 508 is connected to the crank 506 and to the frame 260, and the spring 508 normally urges the crank 506 to an extreme position of counterclockwise rotation, as shown in FIGURES 1 and 23. The nickel sensing tube link 430 (previously described) interconnects the lower nickel sensing tube lever 410 with the crank 506. Similarly, the crank 509 (see FIGURE 4) is normally urged to an extreme position of clockwise rotation, as shown in FIGURE 4, by a spring 511, which interconnects the crank 509 and the frame 260. The dime sensing tube link 431 (previously described) interconnects the lower dime tube sensing lever 411 with the crank 509.

In this manner, rotation of the sensing levers 410 and 411 is translated into corresponding vertical movement of the links 504 and 503 respectively, which in turn impart a corresponding vertical movement to the slides 502 and 501 respectively and to the links 500 and 499 respectively. The links 499 and 500 of course translate their induced vertical movement into rotation of the respective cranks 491 and 490.

A coin block-out lever housing 512 (see FIGURES 21 and 22) is affixed to the main frame 3. The housing 512 comprises a base 513, a perpendicular flange 514, and an L-shaped perpendicular flange 515. A shaft 518 is mounted on the housing 512 between an upper bracket 516 and a lower bracket 517 thereof. A quarter block-out finger lever 519 is mounted on the shaft 518, and similarly a nickel block-out finger lever 520, and a dime block-out finger lever 521 are also mounted on the shaft 518 in spaced parallel relationship. Each of the levers 519, 520, and 521 comprise spring metal wire segments which are coiled about the shaft 518 such that the opposite ends thereof extend in opposite generally parallel directions, as best seen in FIGURES 20 and 21. Also, each of the levers 519, 520, and 521 is provided with perpendicular extension finger portions 519F, 520F, and 521F, respectively, which extension finger portions extend into suitable apertures provided in the coin rejector and credit mechanism 2, as best seen in FIGURE 20. As is conventional practice with such coin block-out arrangements, the insertion of the finger extensions into the coin rejector and credit mechanism 2 will cause coins deposited therein to be automatically ejected so as to prevent the establishment of credit. In the arrangement shown in the drawings, insertion of the finger extension 519F will block-out quarter coins deposited in the mechanism 2, and similarly insertion of the finger extension 520F and 521F will respectively block-out nickels and dimes inserted in the mechanism 2. The opposite end portions of the respective levers 519, 520, and 521 extend through slots 522, 523, and 524 respectively provided in the perpendicular flange 514 of the housing 512. Torsion springs 525, 526, and 527 are each mounted on the shaft 518 adjacent the respective levers 519, 520, and 521, and the opposite ends of the springs are connected to the flange 514 and to their associated levers, such that the finger extensions 519F, 520F, and 521F are normally urged to rotate downwardly with respect to the plane of FIGURE 21.

Generally L-shaped levers 529, 530, and 531 are each rotatably mounted on the flange 514 by the respective pins 532, 533, and 534. The levers 529, 530, and 531 are respectively associated with the levers 519, 520, and 521, and the vertical leg of each of the levers 529, 530, and 531 (relative to the FIGURE 22 disposition) engages the end portion of each of the respective levers 519, 520, and 521 which extend through the respective slots 522, 523, and 524.

A vend slide 535 is mounted for vertical reciprocable movement relative to the housing 512 by the bearing pins 537 and 538. The dime slide 501 and the nickel slide 502, previously described, are mounted on the same pins 537 and 538 for a corresponding movement, that is, the slides 535, 501, and 502, are disposed in a stacked and overlapping relationship. A spring 536 interconnects the upper end of the vend slide 535 and the main frame 3 and thereby normally urges the slide 535 to an upward position, as shown in FIGURES 21 and 22. Another spring 548, one end of which is affixed to a pin 549 of the main frame 3 and the opposite end of which crosses over a detent extension 547 of the slide 535, normally urges the slide 535 downwardly against the force of the spring 536. The free end of the spring 548 is disposed in the path of a roller 550 carried at the upper end of the main drive slide 76, such that, when the main drive slide 76 is in its normal rest or upward disposition, the spring 548 is disengaged from the detent extension 547 of the slide 535, whereas, when the main drive slide 76 is operatively moved vertically downwardly, the roller 550 releases the spring 548 which then bears against the detent extension 547 so as to urge the slide 535 downwardly against the force of the spring 536.

The vend slide 535 is also provided with three spaced tab extensions 541, 542, and 543, which are disposed respectively adjacent the generally horizontal legs (relative to the FIGURE 22 disposition) of the respective levers 529, 530, and 531. Similarly, the dime slide 501 is provided with tab extension 546, and the nickel slide 502 is provided with two spaced tab extensions 544 and 545. The tab extensions 545 and 546 are disposed adjacent the generally horizontal leg of the lever 529, whereas the tab extension 544 is disposed generally adjacent the generally horizontal leg of the lever 531.

A spring 540 interconnects the housing 512 and the dime crank 491, and the spring 540 normally tends to urge the crank 491 to rotate counterclockwise (relative to the FIGURE 21 disposition). Similarly, a spring 539 interconnects the nickel crank 490 and the main frame 3, and the spring 539 normally tends to urge the crank 492 to rotate correspondingly to the crank 491 (that is, into the plane of the drawing of FIGURE 22).

By virtue of the foregoing arrangement, the levers 529, 530, and 531 will normally rest in the positions shown in FIGURE 22, that is, the levers 529 and 531 will be rotated clockwise so as to enable the respective levers 519 and 521 to move upwardly from the plane of the drawing of FIGURE 21 into respective quarter and dime block-out positions, whereas the lever 530 will be rotated counterclockwise as the spring 526 urges the nickel block-out lever 520 downwardly from the plane of the drawing of FIGURE 21 into a nickel non-block-out position. The rest position shown in FIGURE 21 corresponds to an empty signal from both the nickel changer tube 388 and the dime changer tube 389, as indicated by the clockwise positioning of the lower nickel sensing lever 410 and the lower dime sensing lever 411 (relative to the FIGURE 1 disposition). In this given condition, nickels may be passed through the coin rejector and credit mechanism 2, while dimes and quarters inserted therein will be automatically rejected by virtue of the insertion of the finger extensions 519F and 521F into the mechanism 2.

When the nickel changer tube 388 is provided with a sufficient level of nickels, the lower nickel sensing lever 410 will be maintained in a counterclockwise position (relative to the FIGURE 1 disposition). This positioning of the lever 410 (via interaction of the link 430, the crank 506, and the link 504) allows a vertically upward displacement of the nickel slide 502, by virtue of the spring 539 urging the crank 492 to rotate so as to pull the link 500 upwardly. When the slide 502 moves upwardly as described, the tab extension 544 of the slide 502 is removed from its blocking position adjacent the lever 531, and the lever 531 then rotates counterclockwise (relative to the FIGURE 22 disposition) so as to effect a withdrawal of the lever 521 from the dime block-out position. The tab extension 545 of the slide 502 is also withdrawn from engagement with the lever 529, but the lever 529 is still impeded from rotation by virtue of the tab extension 546 of the slide 501.

When, however, a sufficient number of dimes has been received in the dime changer tube 389, the lower dime sensing lever 411 will rotate counterclockwise (relative to the FIGURE 1 disposition), and this rotation, via the link 431, the crank 509, and the link 503, will allow an upwardly vertical displacement of the dime slide 501, by virtue of the spring 540 urging the crank 491 to rotate so as to pull upwardly on the link 499.

This upward movement of the slide 501 withdraws the tab extension 546 from engagement with the lever 529, and the quarter block-out lever 519 is then withdrawn from insertion in the coin rejector and credit mechanism 2 to a non-block-out position. In other words, when both nickels and dimes are present in the respective coin changer tubes 388 and 389, all of the coin block-out levers 519, 520, and 521 are withdrawn from insertion in the coin rejector and credit mechanism 2 to non-block-out positions.

When, however, the nickel changer tube 388 displays an empty signal and the dime changer tube 389 displays a contents signal, in accordance with the foregoing description of events, the slide 501 will move upwardly while the slide 502 remains stationary. Under these conditions, the tab extension 546 of the slide 501 is withdrawn from engagement with the lever 529, but the tab extension 545 of the slide 502 still prevents rotation of the lever 529, and, of course, the tab extension 544 of the slide 502 also prevents rotation of the lever 531, whereby a quarter block-out and a dime block-out condition is realized in the positioning of the respective levers 519 and 521.

The cranks 490 and 491, which rotate according to the disposition of the slides 501 and 502, cause various signals to be displayed upon the rotating flag signal assembly 497, in accordance with the respective positioning of the cranks 490 and 491. Thus, when both the nickel changer tube 388 and the dime changer tube 389 are not sufficiently full, both of the cranks 490 and 491 will be rotated to an extreme clockwise position (relative to the FIGURE 20 disposition). Under these circumstances, the crank 490 will engage the lever 492 which will cause a "USE NICKELS ONLY" indicia to be represented on the rotating flag signal assembly 497. Even if dimes are present in the dime changer tube 389, when nickels are not present in the nickel changer tube 388 (as indicated by the dispositions of the cranks 490 and 491 in FIGURE 20), the same "USE NICKELS ONLY" indicia will be shown, since the presence of the "USE NICKELS ONLY" indicia is a function of the positioning of the crank 490, irrespective of the positioning of the crank 491. Thus, whenever the crank 490 is disposed in its extreme position of clockwise rotation (relative to the FIGURE 20 disposition), a "USE NICKELS ONLY" indicia will be exhibited by the rotating flag signal assembly 497, regardless of the presence or absence of dimes in the dime changer tube 389.

When, however, the nickel changer tube 388 has a sufficient number of nickels therein, the crank 490 will be rotated counterclockwise (relative to its FIGURE 20 disposition), and the lever 492 and the link 494 will be withdrawn from operative engagement with the rotating flag signal assembly 497 (by spring means not shown). In this state of events, the positioning of the rotating flag signal assembly will be determined by the positioning of the crank 491. When the dime changer tube 389 is not sufficiently full of dimes, the crank 491 will be rotated to its extreme clockwise position (relative to the FIGURE 20 disposition), and the lever 493 and the link 495 will cause a "USE NICKELS OR DIMES ONLY" indicia to be displayed on the rotating flag signal assembly 497. When the dime changer tube 389 has a sufficient number of dimes therein, the crank 491 will rotate counterclockwise (to the position shown in FIGURE 20), and a "USE NICKELS, DIMES, OR QUARTERS" indicia will be displayed upon the rotating flag signal assembly 497.

In summary, whenever the nickel changer tube 388 is not sufficiently full, a "USE NICKELS ONLY" flag will be displayed, regardless of the presence or absence of dimes in the dime changer tube 389. However, whenever the nickel changer tube 388 has a sufficient number of nickels therein, the flag signal will be "USE NICKELS OR DIMES ONLY" when the dime changer tube 389 is not sufficiently full and will be "USE NICKLES, DIMES, OR QUARTERS" when the dime changer tube 389 is sufficiently full. In this manner, a vending machine equipped with the coin responsive vending mechanism 1 will accept nickels only when its supply of nickels and dimes in the nickel and dime changer tubes is depleted and, in fact, will accept nickels only, even if it contains dimes in the dime changer tube, so long as the nickel changer tube is not sufficiently full. Likewise, the vending unit will accept nickels and dimes but will reject quarters when the nickel tube has nickels therein and the dime tube is empty, since dimes may be required to make change from a quarter deposit (e.g., a five cent purchase with a quarter deposit). However, when the vending unit has sufficient nickels and dimes in both of its changer tubes, it will accept either nickels, dimes, or quarters, as it will be equipped, if necessary, to make as much as twenty cents change (e.g., one dime and two nickels change for a quarter deposit on a five cent vend item).

FIGURES 32-34 illustrate a price level selector assembly generally designated by the reference numeral 800. One such assembly 800 is provided for each column of merchandise to be vended. The individual assembly 800 shown in the drawings comprises a housing 558 which is pivotally mounted on a frame 560 of a vending unit by a pivot pin 559. A cam slide 561 is longitudinally received in the hollow interior of the housing 558. The slide 561 is provided with a detent 562 and with an upturned flange 564 so as to limit relative movement of the slide 561 in the housing 558. The operator of the vending unit may move the slide 561 to any of several predetermined positions relative to the housing 558 by appropriate manipulation of the flange 564, as hereinafter described. An opening 558H is provided in the housing 558, and a detent pin 565, which is integral with the housing 558, extends therein. A window slot 566 is provided in the top surface of the housing 558, and an arcuate groove 567 is provided in the housing 558 adjacent a price actuating slide 575.

The price actuating slide 575 is mounted in the vending unit immediately beneath the housing 558 and perpendicular thereto. Spring means (not shown) are provided to allow for movement of the slide 575 transverse of the housing 558 and for return of the slide 575 to the disposition shown in FIGURE 27. The price actuating slide 575 is provided with a series of pins 576 (only one being shown in the drawings), one adjacent each assembly 800, in order to cooperate with the cam slide 561 and with the arcuate slot 567, in a manner hereinafter described.

The housing 558 is provided with a sloped shoulder surface 568 which is adapted to cooperate with a pull member 580, which is actuated by a vend knob (by means not shown). One such pull member is provided for each assembly 800, in the schematic manner indicated in FIGURE 32. When the vend knob is pulled, the pull member 580 moves in the direction indicated by the arrow in FIGURE 32, toward the shoulder 568, and causes the housing 558 and its associated cam slide 561 to rotate about the pivot pin 559 in the direction indicated by the arrow adjacent the pin 559 in FIGURE 32.

A series of triangular cut-out portions 569, 570, and 571 are provided in the cam slide 561 to cooperate with the detent pin 565 of the housing 558. The cam slide 561 is also provided with a series of stepped shoulders 572, 573, and 574 adjacent the price actuating slide 575. When the cam slide 561 is positioned relative to the housing 558 in the full line position shown in FIGURE 32 (i.e., the detent pin 565 being received in the triangular cut-out portion 570, and the shoulder 573 bearing against the pin 576), a medium price position is defined, as indicated by the letter "M" showing through the window 566 of the housing 558. In this position, the described rotation of the housing 558 by the pull member 580 causes the actuating slide 575 to impede against the actuating lever 198 (previously described with reference to the price selector tab mechanism 163, shown in FIGURES 8-14) and to rotate it by a given incremental amount.

In order to change the price setting, the operator of the vending unit may grasp the cam slide 561 by the flange 564 and may pull it to the left (relative to the FIGURE 32 disposition) until the detent 562 is impeded by the shoulder 563 of the housing 558. In this position (indicated by the double dash phantom lines in FIGURE 32), the detent pin 565 is received in the triangular cut-out portion 569 and the shoulder 574 is positioned in alignment with the pin 576 of the actuating slide 575 and beneath the arcuate groove 567 of the housing 558. When the housing 558 is then rotated by the pull member 580, the actuating slide 575 remains stationary, notwithstanding the fact that the movement of the housing 558 causes the pin 576 to impede against the shoulder 574 within the arcuate groove 567. In this position, a low price position is indicated through the window 566 by the appearance of the letter "L" therein.

In order to change to a high price setting, the operator may grasp the flange 564 and push it to the right (relative to the FIGURE 32 disposition) until the flange 564 is impeded by the housing 558. In this position (indicated by the single dash phantom lines in FIGURE 32), the detent pin 565 is received in the triangular cut-out portion 571, and the shoulder 572 bears against the pin 576 of the actuating slide 575. Rotation of the housing 558 by the pull member 580 then results in movement of the price actuating slide 575 by a given incremental amount which is greater than the amount of movement of the slide 575 imparted by the full line medium price position shown in FIGURE 32. In this high price setting, the letter "H" appears through the window 566.

It should be apparent that, by appropriate manipulation of the cam slide 561 between the extreme left hand double dash phantom line low price setting; the full line medium price setting; and the extreme right hand single dash phantom line high price setting, the vend column associated with a given price level selector assembly 800 may be set at any one of three graduating price levels, such that the actuating slide 575 will signal the appropriate price signal either by: no movement thereof for the low price setting; a given amount of incremental movement thereof for the medium price setting; and a further amount of additional movement for the high price setting. This movement of the actuating slide 575 causes a corresponding movement of the actuating lever 198, whereby the price selector tab mechanism 163, as previously described, reflects the indicated price value by appropriate positioning of the tab keys 191, 192, and 193 in the path of the price sensing lever 162. In other words, the extent of downward movement of the price sensing lever 162 is a function of a predetermined price value set upon the given price level selector assembly 800 for the column of merchandise which is selected by the user of the machine.

From the foregoing description, it will be apparent that in normal operation for a medium price setting the actuating slide 575 is caused to move downwardly (relative to its FIGURE 32 disposition) by a predetermined increment. This increment of linear motion causes the price selector tab mechanism 163 to rotate to a corresponding medium price position. However, during abnormally fast operations, the price selector tab mechanism 163 might continue to rotate (by virtue of momentum) beyond the medium price position. Thus, it is possible that a high price rather than the selected medium price might be sensed. In order to obviate this momentum induced over-shooting of the price selector tab mechanism 163, an anti-over-shoot modification such as illustrated in FIGURES 35-37 may be utilized. In this arrangement a stop bracket 575B is secured to the actuating slide 575. Another bracket 163B is secured to the top of a price selector tab mechanism 163'. An adjustment screw 163S is threadably received in the bracket 163B and is fixed in a given position by means of a locking nut 163N. The screw 163S is normally adjusted for a nominal clearance between the end thereof and the stop bracket 575B at a medium price position for the price selector tab mechanism 163'. If the mechanism 163' begins to rotate beyond the selected medium price position, the end of the screw 163S would contact the stop bracket 575B, thereby obviating excessive over-shooting of the mechanism 163'. This cooperation between the bracket 575B and the screw 163S is required only during the course of medium price selections and has no function in either the low or the high price positions. Aside from the incorporation of the bracket 163B and the screw 163S, the price selector tab mechanism 163' is identical to the previously described price selector tab mechanism 163, as indicated by the corresponding reference numeral 198 for the actuating lever shown in FIGURE 35.

Another modification of the previously described arrangement is illustrated in FIGURES 38 and 39 wherein means are provided for manually activating the coin changing sequence in order to empty the contents of the changer tubes 388 and 389. These means basically comprise a crank lever 551 which is rotatably mounted on the frame 260 by a pin assembly 552. The crank lever 551 is provided with an extending flange portion 555 and with an elongated slot 553, which receives a bearing pin assembly 554 affixed to the frame 260. A roller 557 is mounted on the crank lever 551 by a pin 556, and the roller 557 is positioned adjacent the flange 335 of the changer slide 286. With this feature incorporated into the previously described mechanism, an operator of the machine need only grasp the extending flange 555 and rotate the crank lever 551 to the phantom line position shown in FIGURE 31, whereby the changer slide 286 will activate the change cycle, in the same manner as will be hereinafter described for the automatic operation for producing change. The crank lever 551 is reciprocably pumped up and back in order to empty the changer tubes to any desired extent. Conversely, as hereinafter described, the changer tubes may be filled with coins to any desired extent via the manual fill slide 391.

The operation of the previously described structural components may be summarized in the following manner. If empty, the nickel and the dime changer tubes 388 and 389 are filled with nickels and dimes respectively by appropriate insertion of such coins through the manual fill slide 391, which serves to orient the respective coins into proper alignment upon entry into the tubes 388, 389. During the filling operation, the sensing levers 408–411 are manually withdrawn from the tubes 388, 389 so as not to impede the movement of coins therethrough. As the coins fall from the manual fill slide 391 into the respective tubes 388, 389, it will be observed that a resilient cushion is provided by the spring metal base plate 374 and the spring metal tube bottom 375. This resilient cushion further serves to minimize jamming due to bent or offsize coins which are received in the changer tubes 388, 389. When the tubes have been filled as indicated, the sensing levers 408–411 are released, and, of course, these levers will be impeded from entrance into their respective openings 413–416 of the changer tubes 388 and 389, by virtue of the presence of nickels and dimes therein respectively. This situation, as previously described, will cause a "USE NICKELS, DIMES, OR QUARTERS" indicia to be displayed by the coin flag subassembly 600 and will likewise cause the nickel full blocking lever 462 and the dime full blocking lever 463 to cover the pocket portion P of the nickel-dime chamber 454 so as to prevent the retention of nickels or dimes in the said pocket. However, it should be apparent that alternative dispositions of the changer tubes 388 and 389 can be accommodated during operation. For example, the self-filling of the changer tubes 388 and 389 (by appropriate retention of coins in the pocket portion P of the nickel-dime chamber 454) may be accomplished when the upper nickel and dime sensing levers 408 and 409 respectively are received within the openings 414 and 416 respectively so as to cause the nickel and the dime full blocking levers 462 and 463 respectively to expose the pocket portion P of the nickel-dime chamber 454 in order to allow the retention of nickels or dimes in the said pocket for subsequent entry into the respective nickel and dime changer tubes 388 and 389 upon completion of a vend cycle.

When the vending unit is provided with coins in the changer tubes 388 and 389, the coin-responsive vending mechanism 1 may be adjusted, by appropriate manipulation of the price level selectors 800, to a high, medium, or low price level for each of the columns of merchandise contained in the vending unit. The price selector tab mechanism 163 is then adjusted to define a given price value for each of the high, medium, and low price levels, by appropriate positioning of the tab keys 191–193. For example, it may be desired to vend a donut item for five cents, a first type of sandwich for twenty cents, and a second type of sandwich for forty cents, all from the same vending unit. The price level selector 800 corresponding to the donut would then be set at its low setting, and the selectors 800 corresponding to the two types of sandwiches would be set to the medium and high levels thereof respectively. The tab key 191 would then be placed in the five cent slot shown in FIGURE 9, the tab key 192 would be set in the twenty cent slot, and the tab key 193 would be set in the forty cent slot.

For purposes of description, it will be assumed that a customer desires to purchase the nickel donut item and that the "USE NICKELS, DIMES, OR QUARTERS" coin inventory status is provided in the coin-responsive mechanism 1. The customer accordingly could place a nickel into the coin slot aperture 20. This nickel would pass through the coin rejector and credit mechanism 2, thereby establishing a five cent credit value on the credit accumulator wheel 26 (in a conventional manner), would bounce off the nickel full blocking lever 462, and would be finally positioned in the escrow space 455. At this stage, the customer could elect to retract his credit by actuation of the coin return sequence (as previously described and as illustrated in FIGURE 6), or he could utilize his credit for the desired selection so as to route the deposited coin to the cash box (as previously described and as illustrated in FIGURE 5).

Utilization of the credit is accomplished by pulling on the vend knob 240 (corresponding to the nickel donut item) so that the customer actuates the drive rack 243. Movement of the drive rack 243 effects a linear movement of the price actuating slide 575 (via the pivoting of the price level selector assembly 800 into engagement with the pin 576 by means of the pull member 580). The price actuating slide 575 engages the actuating lever 198 of the selector tab mechanism, and, since a low price position has been pre-set on the price level selector assembly 800 corresponding to the donut item, no rotation of the selector tab mechanism 163 is effected. Therefore, the uppermost or low price tab key 191 is retained in the path of movement of the price sensing lever 162.

Also, the described movement of the drive rack 243 actuates the main drive slide 76 for downward movement, as shown in FIGURE 7. The main drive slide 76 and its associated sensing drive slide 111 move downwardly and allow the main sensing arm 129 to pivot clockwise under the influence of the spring 131 (see FIGURE 7). This movement of the main sensing arm 129 causes an upward movement of the credit sensing slide 134 toward the credit accumulator wheel 26. As the credit sensing slide 134 moves upwardly, the changer actuator lever 141 pivots counterclockwise about its left hand end (attached to the changer lift lever 144) as a pivot point (since the changer lift lever 144 is spring biased downwardly and the pivot slide 145 is spring biased upwardly). The pivot slide 145 accordingly moves upwardly, and the price selector lever 158 pivots counterclockwise so as to urge the price sensing lever 162 downwardly. The price sensing lever 162 will move downwardly until impeded by the uppermost or low price tab key 191. As soon as the price sensing lever 162 is impeded from further movement, the price selector lever 158 is locked from further counterclockwise rotation, and correspondingly, the pivot slide 145 is locked from further upward movement. Therefore, any further upward movement of the credit sensing slide 134 will effect a clockwise rotation of the changer actuator lever 141 with its right hand end (attached to the pivot slide 145) as a pivot point. This clockwise rotation of the changer actuator lever 141 effects an upward movement of the changer lift lever 144.

At this point, it may be noted that the latching subassembly 5 serves to lock the pivot slide 145 in its upward position so that the described clockwise rotation of the changer actuator lever 141 and attendant upward movement of the changer lift lever 144 may take place. If the pivot slide 145 were not locked from downward movement, the upward movement of the credit sensing slide 134 could be translated into a downward movement of the pivot slide 145 and a corresponding upward movement of the price sensing lever 162, without signalling the appropriate upward movement of the changer lift lever 144. However, eventually the pivot slide 145 must be freed for downward movement so that the mechanism may return to its rest disposition, and, for this purpose, the sensing drive slide 111 is released from the main drive slide 76 prior to the completion of its downward stroke (by the previously described interaction of the roller 106 with the cam plate 97). As previously described this release of the sensing drive slide 111 releases the latching subassembly 5 so that the pivot slide 145 may move downwardly in accordance with a downward or return movement of the credit sensing slide 134 occasioned by upward movement of the sensing drive slide 111 and the associated counterclockwise pivoting of the main sensing arm 129.

Under the assumed conditions of establishment of five cents credit and the selection of a five cent item, the price sensing lever 162 will be stopped by the selector tab mechanism 163 prior to the stopping of the credit sensing slide 134 by the credit accumulator wheel 26. This situation indicates that sufficient credit has been established to allow completion of a vend cycle, in the following manner. The credit sensing slide 134 continues moving upwardly, and, since the price sensing lever 162 and therefore the pivot slide 145 are locked, the changer lift lever 144 commences to move upwardly. This upward movement of the changer lift lever 144 frees the credit lockout pivot lever 206 for rotation. The credit lock-out pivot lever 206 then rotates, in the manner previously described, and the credit lock-out slide 208 moves downwardly to allow the credit lock-out bar 249 to fall downwardly in order to allow further movement of the drive rack 243. The said further movement of the drive rack 243 causes a continued downward movement of the drive slide 76 in order to complete the vend cycle. It should be observed that, if insufficient credit is registered on the credit accumulator wheel 26 (i.e., stopping of the credit sensing slide 134 prior to stopping of the price sensing lever 162), the upward movement of the credit sensing slide 134 will be terminated at a sufficiently early time to prevent upward movement of the changer lift lever 144 and therefore to prevent the described placement of the credit lock-out bar 249, whereby the drive rack 243 will be jammed from further movement in the vending direction so as to prevent completion of the vend cycle.

When, however, sufficient credit is established so that the credit sensing slide 134 continues upward movement after termination of downward movement of the price sensing lever 162, the induced upward movement of the changer lift lever 144 effects a corresponding upward movement of the change level slide 346 (since the changer lift lever 144 is affixed to the change level slide 346 by means of the spring latch 350). Under the assumed conditions of five cents credit and a five cent selection, the upward movement of the credit sensing slide 134 will be terminated when the change level slide 346 is raised to the position shown in FIGURE 31. In this position, the L-bar guide 333 is situated above the flange N of the change level lock member 361, and the slide engaging members 356 and 358 (affixed respectively to the captive slide 338 and to the change level slide 346) are positioned such that the slide engaging member 356 does not engage any of the nickel slides 363 and 364 or the dime slide 362, all three slides being blocked from movement by the slide engaging member 358. Under these conditions, downward movement of the main drive slide 76 actuates the changer slide 286 for reciprocable movement, but no change is removed from the coin tubes 388 and 389. The downward movement of the main drive slide 76 also serves to activate the escrow unit 308 to its FIGURE 5 disposition so that the deposited nickel will be routed to the cash box (not shown).

The previous description assumed that the customer deposited a nickel for the selection of a nickel item whereby no change was required or dispensed. However, the customer may deposit a dime so as to establish ten cents credit and yet may select only a nickel item. In such an instance, the price sensing lever 162 will be impeded by the price selector tab mechanism 163 in the same manner as previously described, but the credit sensing slide 134 will move further upwardly before being impeded by the credit accumulator wheel 26. This further movement of the credit sensing slide 134 effects in turn a corresponding further upward movement of the changer lift lever 144 and therefore of the change level slide 346 to the position shown in FIGURE 27. In this situation, the L-bar guide 333 is disposed between the flanges N and D of the change level lock member 361 so that the nickel slide 363 is positioned for engagement with the slide engaging member 356 while the nickel slide 364 and the dime slide 362 are blocked by the slide engaging member 358. Under these conditions, actuation of the changer slide 286 by downward movement of the main drive slide 76 will cause reciprocable movement of the nickel slide 363 so as to dispense a nickel from the nickel changer tube 388. In this manner, the customer receives the five cents change required by the ten cents established credit value and the five cents selection price.

In like manner, the customer could deposit fifteen cents, twenty cents, or twenty-five cents so as to require ten cents, fifteen cents, or twenty cents change respectively for a nickel selection. FIGURES 28, 29, and 30 respectively indicate the desired change levels for dispensing ten, fifteen, and twenty cents change, as required. As shown in FIGURE 28, the slide engaging member 356 engages the dime slide 362 while the slide engaging member 358 blocks both of the nickel slides 363 and 364 so that a dime is removed from the dime coin tube 389. As shown in FIGURE 29, the slide engaging member 356 engages the nickel slide 363 and the dime slide 362 so as to remove a nickel and a dime from the coin tubes 388 and 389 for a total of fifteen cents change. As shown in FIGURE 30, the slide engaging member 356 engages all three slides 362, 363, and 364 so as to remove two nickels and one dime from the coin tubes 388 and 389 for twenty cents change.

The foregoing description has assumed that a nickel or low price item is selected at various values of established credit. If higher priced items are selected (such as the previously indicated twenty and forty cent sandwiches), it should be apparent that the price sensing lever 162 will move further downwardly before being impeded by the selector tab mechanism 163. In other words, for a given established credit value, the price sensing lever 162 will move in a linear direction proportionate to the price of the selected item, and, of course, the more the price sensing lever 162 moves downwardly, the less the changer lift 144 can move upwardly. Also, the credit sensing slide 134 moves upwardly by a distance proportionate to the established credit value. Therefore, for a given price of a selected article, the higher the credit sensing slide 134 moves upwardly, the higher the changer lift lever 144 can move upwardly. For any given vend cycle, the price and the credit values (determined respectively by downward movement of the price sensing lever 162 and by upward movement of the credit sensing slide 134) interrelate to determine the resultant change level value indicated by the extent of upward movement of the changer lift lever 144. This upward movement of the changer lift lever 144 can assume any of the positions shown in FIGURES 27–31, namely, five cents, ten cents, fifteen cents, twenty cents, and zero change, respectively.

From the foregoing description, it should be apparent that a price, credit, and change sensing apparatus has been disclosed in a form suitable for the attainment of the objectives of the subject invention. However, it should be understood that various changes, modifications, and alterations may be effected in the details of assembly, arrangements, and operations of the various elements, without departing from the spirit and the scope of the instant invention, as defined in the appended claims.

What is claimed is:

1. Price, credit, and change sensing apparatus for use in equipment which vends in response to coins received therein, the said apparatus comprising:
 a frame;
 credit sensing means mounted for vertical movement relative to the frame;
 credit value means responsive to the credit value of coins received in the vending equipment for impeding the movement of the credit sensing means;
 means for moving the credit sensing means upwardly into engagement with the credit value means;
 resultant change level means mounted for vertical movement relative to the frames;
 changer means responsive to the upward disposition of the resultant change level means relative to the frame for dispensing change as required;
 price sensing means mounted for vertical movement relative to the frame;
 variable price level means responsive to one of a plurality of predetermined price levels for impeding downward movement of the price sensing means; and
 linkage means responsive to upward movement of the credit sensing means for moving the price sensing means downwardly until impeded by the price level means and for thereafter moving the change level means upwardly until the credit sensing means is impeded by the credit value means,
 whereby change is dispensed as required in accordance with the selected price and credit values sensed by the apparatus.

2. Apparatus as claimed in claim 1, wherein the said variable price level means comprises:
 a series of tab keys, each corresponding to a successive price level; and
 means for selectively positioning a predetermined one of the said tab keys in the path of movement of the price sensing means in order to impede the downward movement thereof.

3. Apparatus as claimed in claim 1, and further comprising price level selector means for actuating the variable price level means so as to select one of a plurality of predetermined price levels for impeding downward movement of the price sensing lever.

4. Apparatus as claimed in claim 1, wherein the said changer means comprises:
 a coin tube secured to the frame;
 extraction slide means adapted to cooperate with the coin tube so as to remove the lowermost coin contained therein;
 slide engaging means associated with the said resultant change level means and adapted to actuate the slide extraction means when the said resultant change level means is positioned at a predetermined upward disposition relative to the frame; and
 means for reciprocating the slide engaging means so as to dispense the said lowermost coin.

5. Apparatus as claimed in claim 1, and further comprising latching means for maintaining the price sensing means in its downward impeded position of engagement with the price level means, while the change level means moves upwardly.

6. Price, credit, and change sensing apparatus for use in equipment which vends in response to coins received therein, the said apparatus comprising:
 a frame;
 drive slide means mounted for vertical movement relative to the frame;
 actuating means for moving the drive slide means downwardly during the course of actuation of the vending equipment;
 credit sensing means mounted for vertical movement relative to the frame;
 credit value means responsive to the credit value of coins received in the vending equipment for impeding the movement of the credit sensing means;
 means responsive to downward movement of the drive slide means for moving the credit sensing means upwardly into engagement with the credit value means;
 resultant change level means mounted for vertical movement relative to the frame;
 changer means responsive to the upward disposition of the change level means relative to the frame for dispensing change as required;
 price sensing means mounted for vertical movement relative to the frame;
 variable price level means responsive to one of a plurality of predetermined price levels for impeding downward movement of the price sensing means; and
 linkage means responsive to upward movement of the credit sensing means for moving the price sensing means downwardly until impeded by the price level means and for thereafter moving the change level means upwardly until the credit sensing means is impeded by the credit value means,
 whereby change is dispensed as required in accordance with the price and credit values sensed by the apparatus.

7. Apparatus as claimed in claim 6, wherein the said actuating means for moving the drive slide means downwardly comprises:
 a first rack member adapted to be manually displaced relative to the frame;
 a pinion member rotatably mounted on the frame;
 a second rack member mounted for vertical movement relative to the frame, the said pinion intermeshing with both of the said rack members; and
 means on the second rack member for engaging the drive slide means,
 whereby manual actuation of the first rack member induces vertical movement of the second rack member and thereby induces downward movement of the drive slide means.

8. Price, credit, and change sensing apparatus for use in equipment which vends in response to coins received therein, the said apparatus comprising:
 a frame;
 a drive slide mounted for vertical movement relative to the frame;
 spring means normally biasing the drive slide upwardly;
 means for moving the drive slide downwardly during the course of actuation of the vending equipment;
 a credit sensing slide mounted for vertical movement relative to the frame;
 a credit accumulator wheel responsive to the credit value of coins received in the vending equipment and disposed on the frame in alignment with the upper end of the credit sensing slide;
 a main sensing arm pivotally mounted on the frame so as to have one end operatively engaging the credit sensing slide and so as to have another end operatively engaging the drive slide;
 spring means normally biasing the main sensing arm to rotate so as to urge the credit sensing slide upwardly toward the credit accumulator wheel when the drive slide is moved downwardly;

a changer actuator lever carried by the credit sensing slide;

a changer lift lever mounted for vertical movement relative to the frame and pivotally engaging one end of the changer actuator lever at a first pivot point;

a pivot slide mounted for vertical movement relative to the frame and pivotally engaging another end of the changer actuator lever at a second pivot point;

spring means normally biasing the pivot slide downwardly;

spring means normally biasing the changer lift lever downwardly;

a price sensing lever mounted for vertical movement relative to the frame;

a price selector lever pivotally mounted on the frame and having one end engaged with the price sensing lever and another end engaged with the pivot slide;

variable price level means responsive to one of a plurality of predetermined price levels for impeding downward movement of the price sensing lever; and change means responsive to the upward disposition of the change lift lever for dispensing change, whereby downward movement of the drive slide causes upward movement of the credit sensing slide toward the credit accumulator wheel, the said upward movement of the credit sensing slide causing the changer actuator lever to rotate about the first pivot point, so as to elevate the pivot slide and thereby to depress the price sensing lever via induced rotation of the price selector lever, until the price sensing lever is impeded by the price level means, at which time further upward movement of the credit sensing slide until impeded by the credit accumulator wheel is translated into rotation of the changer actuator lever about the second pivot point, so as to elevate the changer lift lever for dispensing change, as required.

9. Apparatus as claimed in claim 8 and further comprising latching means for impeding downward movement of the pivot slide while the said further upward movement of the credit sensing slide until impeded by the credit accumulator wheel is translated into rotation of the changer actuator lever about the second pivot point, so as to elevate the changer lift lever for dispensing change, as required.

10. Apparatus as claimed in claim 9 wherein the said latching means comprises:

a reset lever pivotally mounted on the frame and having a free end thereof affixed to the drive slide;

ratchet teeth carried by the pivot slide;

latching pawl means for preventing downward movement of the pivot slide; and trigger means carried by the reset lever for disengaging the latching pawl means from the ratchet teeth of the pivot slide when the drive slide moves upwardly.

11. Price, credit, and change sensing apparatus for use in equipment which vends in response to coins received therein, the said apparatus comprising:

a frame;

a main drive slide mounted for vertical movement relative to the frame;

spring means normally biasing the main drive slide upwardly;

a sensing drive slide mounted for vertical movement relative to the frame;

means detachably securing the sensing drive slide to the main drive slide;

spring means normally biasing the sensing drive slide upwardly;

means for moving the main drive slide and its attached sensing drive slide downwardly during the course of actuation of the vending equipment;

a credit sensing slide mounted for vertical movement relative to the frame;

a credit accumulator wheel responsive to the credit value of coins received in the vending equipment and disposed on the frame in alignment with the upper end of the credit sensing slide;

a main sensing arm pivotally mounted on the frame so as to have one end operatively engaging the credit sensing slide and so as to have another end operatively engaging the sensing drive slide;

spring means normally biasing the main sensing arm to rotate so as to urge the credit sensing slide upwardly toward the credit accumulator wheel when the sensing drive slide is moved downwardly;

a changer actuator lever carried by the credit sensing slide;

a changer lift lever mounted for vertical movement relative to the frame and pivotally engaging one end of the changer actuator lever at a first pivot point;

a pivot slide mounted for vertical movement relative to the frame and pivotally engaging another end of the changer actuator lever at a second pivot point;

spring means normally biasing the pivot slide downwardly;

spring means normally biasing the changer lift lever downwardly;

a price sensing lever mounted for vertical movement relative to the frame;

a price selector lever pivotally mounted on the frame and having one end engaged with the price sensing lever and another end engaged with the pivot slide;

variable price level means responsive to one of a plurality of predetermined price levels for impeding downward movement of the price sensing lever; and change means responsive to the disposition of the change lift lever for dispensing change, whereby downward movement of the main drive slide and its associated sensing drive slide causes upward movement of the credit sensing slide toward the credit accumulator wheel, the said upward movement of the credit sensing slide causing the changer actuator lever to rotate about the first pivot point, so as to elevate the pivot slide and thereby to depress the price sensing lever via induced rotation of the price selector lever, until the price sensing lever is impeded by the price level means, at which time further upward movement of the credit sensing slide until impeded by the credit accumulator wheel is translated into rotation of the changer actuator lever about the second pivot point, so as to elevate the changer lift lever for dispensing change, as required.

12. Apparatus as claimed in claim 11, and further comprising latching means for impeding downward movement of the pivot slide while the said further upward movement of the credit sensing slide until impeded by the credit accumulator wheel is translated into rotation of the changer actuator lever about the second pivot point, so as to elevate the changer lift lever for dispensing change, as required.

13. Apparatus as claimed in claim 12, wherein the said latching means comprises:

a reset lever pivotally mounted on the frame and having a free end thereof affixed to the main drive slide;

ratchet teeth carried by the pivot slide;

a latching pawl pivotally mounted on the frame and spring biased to engage the ratchet teeth of the pivot slide; and a trigger carried by the reset lever and adapted to engage the latching pawl so as to release the latching pawl from the ratchet teeth, whereby the main drive slide and its associated sensing drive slide may move downwardly, thereby rotating the reset lever, until the trigger of the reset lever engages the latching pawl so as to release the latching pawl from the ratchet teeth of the pivot slide in order to allow downward movement thereof.

14. Apparatus as claimed in claim 12, and further comprising:
a latching pawl stop member pivotally mounted on the frame and adapted to engage the latching pawl;
a pivot lever pivotally carried by the reset lever;
link means interconnecting one end of the pivot lever and the latching pawl stop member; and
means for engaging an opposite end of the pivot lever and a lowermost extreme of the sensing drive slide,
whereby movement of the lowermost extreme of the sensing drive slide, as by relative movement of the sensing drive slide and the main drive slide, causes the latching pawl stop member to pivot so as to disengage the latching pawl from the ratchet teeth of the pivot slide.

15. Apparatus as claimed in claim 12, wherein the means detachably securing the sensing drive slide to the main drive slide comprises:
a hook latch pivotally carried by the main drive slide;
a roller carried by the sensing drive slide;
spring means urging the hook latch into engagement with the roller so as to detachably intersecure the sensing drive slide and the main drive slide; and
a cam surface on the frame in the path of movement of the hook latch.
whereby downward movement of the main drive slide causes engagement of the hook latch with the cam surface on the frame such that the hook latch pivots away from engagement with the sensing drive slide to allow upward movement of the sensing drive slide.

16. Latching subassembly comprising:
a frame;
drive slide means mounted for vertical movement relative to the frame;
means for reciprocating the drive slide means;
a reset lever pivotally mounted on the frame and having a free end thereof affixed to the drive slide means;
a pivot slide mounted for vertical movement relative to the frame and adapted to move upwardly when the drive slide means moves downwardly and to move downwardly when the drive slide means moves upwardly;
ratchet teeth carried by the pivot slide;
latching pawl means for preventing downward movement of the pivot slide; and
trigger means carried by the reset lever for disengaging the latching pawl means from the ratchet teeth of the pivot slide when the drive slide means moves upwardly.

17. Latching subassembly comprising:
a frame;
a main drive slide mounted for vertical movement relative to the frame;
spring means normally biasing the main drive slide upwardly;
actuating means for moving the main drive slide downwardly;
a sensing drive slide mounted for vertical movement relative to the frame;
spring means normally biasing the sensing drive slide upwardly;
latch means detachably intersecuring the sensing drive slide and the main drive slide so that the sensing drive slide is released from the main drive slide for spring loaded upward movement after a predetermined extent of downward movement of the main drive slide;
a reset lever pivotally mounted on the frame and having a free end thereof affixed to the main drive slide;
a pivot slide mounted for vertical movement relative to the frame and adapted to move upwardly when the sensing drive slide moves downwardly and to move downwardly when the sensing drive slide moves upwardly;
ratchet teeth carried by the pivot slide;
a latching pawl pivotally mounted on the frame and adapted to engage the ratchet teeth of the pivot slide so as to prevent downward movement thereof;
spring means normally biasing the latching pawl into engagement with the ratchet teeth; and
a trigger carried by the reset lever and adapted to engage the latching pawl so as to release the latching pawl from the ratchet teeth,
whereby the main drive slide and its associated sensing drive slide may move downwardly, thereby rotating the reset lever, until such time as the latch means release the sensing drive slide for upward movement, just prior to which time the said trigger engages the latching pawl so as to release the latching pawl from the ratchet teeth of the pivot slide in order to enable downward movement of the pivot slide in conjunction with upward movement of the sensing drive slide.

18. Latching subassembly as claimed in claim 17, wherein the said latch means comprises:
a hook latch pivotally carried by the main drive slide;
a roller carried by the sensing drive slide;
spring means urging the hook latch into engagement with the roller so as to detachably intersecure the sensing drive slide and the main drive slide; and
a cam surface on the frame in the path of movement of the hook latch,
whereby downward movement of the main drive slide causes engagement of the hook latch with the cam surface on the frame such that the hook latch pivots away from engagement with the sensing drive slide to allow upward movement of the sensing drive slide.

19. Latching subassembly as claimed in claim 17, and further comprising:
a latching pawl stop member pivotally mounted on the frame and adapted to engage the latching pawl;
a pivot lever pivotally carried by the reset lever;
link means interconnecting one end of the pivot lever and the latching pawl stop member; and
means for engaging an opposite end of the pivot lever and a lowermost extreme of the sensing drive slide,
whereby movement of the lowermost extreme of the sensing drive slide, as by relative movement of the sensing drive slide and the main drive slide, causes the latching pawl stop member to pivot so as to disengage the latching pawl from the ratchet teeth of the pivot slide.

20. Variable price selector mechanism for use in coin responsive vending equipment, which comprises:
a movable price sensing lever, the degree of movement of which from a given rest position may be correlated to a signaled price;
stop means for impeding the movement of the price sensing lever to indicate a price value,
the stop means being vertically displaceable relative to the price sensing lever such that the signaled price may be varied by repositioning the stop means relative to the price sensing lever; and
means for horizontally positioning the stop means in the path of movement of the price sensing lever so as to impede the movement thereof.

21. Variable price selector mechanism for use in coin responsive vending equipment, which comprises:
a movable price sensing lever, the degree of movement of which from a given rest position may be correlated to a signaled price;
first stop means adapted to impede the movement of the price sensing lever to indicate a first price;
second stop means adapted to impede the movement of the price sensing lever to indicate a second price;
each said stop means being vertically displaceable relative to the price sensing lever such that the first and second prices may be varied by repositioning the stop means; and means for horizontally positioning one or the other of the stop means in the path of movement of the price sensing lever in order to impede the movement thereof and thereby to selectively indicate the established first or second price.

22. Mechanism as claimed in claim 21 in which the means for horizontally positioning one or the other of the stop means comprises a price level selector assembly including a movable price actuating slide adapted to be displaced by a first linear amount in response to the first price and by a second linear amount in response to the second price.

23. Mechanism as claimed in claim 22 and further comprising means for preventing over-shooting of the price actuating slide.

24. A price selector tab mechanism for use in coin responsive vending equipment which is adapted to vend in response to various price levels, which comprises:
   a frame;
   a shaft fixedly mounted on the frame;
   a housing rotatably mounted on the shaft;
   tab key members, each rotatably mounted on the shaft and each axially displaceable relative thereto;
   price selector retaining means for removably positioning each of the tab key members in the housing;
   a price sensing lever mounted in the frame and adapted for axial displacement relative to the shaft;
   means for rotating the housing with its removably positioned tab key members relative to the shaft; and
   stop means extending from each tab key member and adapted for placement in the path of movement of the price sensing lever,
   whereby the extent of rotative movement of the housing with its removably positioned tab key members relative to the shaft may serve to impede the movement of the price sensing lever at various degrees of movement thereof, as determined by the placement of a given tab key member's stop means into the path of movement of the price sensing lever.

25. A price selector tab mechanism for use in coin responsive vending equipment, which comprises:
   a frame;
   a shaft fixedly mounted on the frame;
   a housing rotatably mounted on the shaft, the said housing having a series of slots therein;
   spring means normally retaining the housing in a low price rest position relative to the shaft;
   a first, a second, and a third tab key, each rotatably mounted on the shaft and axially displaceable with respect thereto and each adapted for positioning in the housing by placement in one of the slots thereof;
   a grid plate having a series of slots therein corresponding in number to the slots of the housing;
   means for detachably securing the grid plate to the housing in order to align and disalign the respective slots thereof such that the said tab keys are locked in a fixed axial position relative to the shaft when the respective slots of the grid plate and the housing are disaligned and are axially displaceable relative to the shaft when the respective slots of the grid plates and the housing are aligned;
   a price sensing lever mounted in the frame for axial displacement relative to the shaft and having a flange portion thereon;
   stop portions on each of the tab keys extending toward the path of movement of the flange portion of the price sensing lever, the stop portions of each of the tab keys being progressively larger in cross-sectional area; and
   means for rotating the housing away from its low price rest position to a first medium price operative position and to a second high price operative position, whereby movement of the price sensing lever may be impeded by the respective stop portions of the tab keys at the indicated low, medium, and high price positions.

26. A price selector mechanism as claimed in claim 25 in which each said tab key comprises:
   a generally rectangular base, the stop portion thereof extending from one side of the base;
   a tab selector portion extending from the opposite side of the base; and
   an enlongated aperture in the base,
   the tab selector portion being adapted for placement in the slots of the grid plate, the stop portion being adapted for placement in the slots of the housing, and the shaft being received in the elongated aperture.

27. A tab key member for use in coin responsive vending equipment, which comprises:
   a generally rectangular base;
   a tab selector portion extending from the base;
   a stop portion extending from the base opposite of the tab selector portion;
   side wing retaining portions extending from the base between the tab selector portion and the stop portion on either side of the base and adapted to maintain the tab key member in a predetermined position; and
   an elongated aperture located in the base between the tab selector portion and the stop portion.

28. A price level selector assembly for use in coin responsive vending equipment which comprises:
   a frame;
   a housing pivotally mounted on the frame;
   a cam slide mounted in the housing for movement relative thereto;
   a series of stepped shoulders on the cam slide, each stepped shoulder corresponding to a successive price level;
   a price actuating slide mounted for reciprocating movement relative to the frame and having a pin thereon; and
   means for positioning the cam slide at varying positions relative to the housing,
   whereby a predetermined one of the stepped shoulders of the cam slide is aligned with the pin of the price actuating slide such that pivotal movement of the housing displaces the price actuating slide by a predetermined extent corresponding to the price level selected.

29. An assembly as claimed in claim 28 and further comprising means for preventing over-shooting of the price actuating slide at all extents of displacement thereof between the lowest and the highest price levels.

30. Coin changer mechanism adapted to selectively dispense a predetermined number of coins of a C1 denomination or of a C2 denomination or of both denominations of a given currency system, which comprises:
   a frame;
   a changer tube housing affixed to the frame;
   a first coin tube vertically seated in the changer tube housing and dimensioned to receive coins of the C1 denomination in stacked alignment therein;
   a second coin tube vertically seated in the changer tube housing and dimensioned to receive coins of the C2 denomination in stacked alignment therein;
   C1 extraction slide means mounted in the changer tube housing beneath the first coin tube for reciprocable horizontal movement relative to the changer tube housing from a coin holding position to a coin discharging position;
   C2 extraction slide means mounted in the changer tube housing beneath the second changer tube for reciprocable horizontal movement relative to the changer tube housing from a coin holding position to a coin discharging position,
   each said extraction slide means being adapted to receive the lowermost coin of its associated coin tube when the said extraction slide means is located in its coin holding position;
a changer slide mounted on the frame for reciprocable horizontal movement relative thereto from a dormant position;
means for reciprocating the changer slide from its dormant position to an operative position and back to its dormant position;
a change level slide mounted on the frame for reciprocable vertical movement relative thereto and gravity biased to a downward rest position;
means for positioning the change level slide at a position of elevated vertical movement relative to its downward rest position;
a captive extracting slide mounted on the changer slide for vertical reciprocable movement relative thereto;
means interconnecting the change level slide and the captive extracting slide such that the captive extracting slide may be reciprocated vertically when the change level slide is reciprocated vertically and may be reciprocated horizontally when the changer slide is reciprocated horizontally;
a first slide engaging member affixed to the change level slide;
a second slide engaging member affixed to the captive extracting slide; and
means on said slide engaging members for selectively engaging either or both of the C1 and C2 extraction slide means whereby the extraction slide means may be blocked from movement or moved from their respective coin holding positions to their respective coin discharging positions in accordance with the dispositions of the change level slide and of the changer slide.

31. Coin changer mechanism as claimed in claim 30, and further comprising a resilient spring plate tube bottom, one end of which is affixed to the changer tube housing beneath the C1 and the C2 extraction slide means and the free end of which extends diametrically across the first and the second coin tubes, whereby a first coin inserted in the uppermost portion of either coin tube will fall through the coin tube until impeded by the resilient spring plate tube bottom and subsequent coins inserted in the uppermost portion of the same coin tube will fall therethrough until impeded by another coin previously positioned therein, such that the resilient spring plate tube bottom may resiliently absorb the impact of a falling coin and may prevent jamming of the extraction slide means in operation.

32. Coin changer mechanism adapted to selectively dispense a predetermined number of coins of a C1 denomination or of a C2 denomination or of both denominations of a given currency system, which comprises:
a frame;
a changer tube housing affixed to the frame;
a first coin tube vertically seated in the changer tube housing and dimensioned to receive coins of the C1 denomination in stacked alignment therein;
a second coin tube vertically seated in the changer tube housing and dimensioned to receive coins of the C2 denomination in stacked alignment therein;
a C1 extraction slide mounted in the changer tube housing beneath the first coin tube for reciprocable horizontal movement relative to the changer tube housing from a coin holding position to a coin discharging position;
a first C2 extraction slide mounted in the changer tube housing beneath the second changer tube for reciprocable horizontal movement relative to the changer tube housing from a coin holding position to a coin discharging position;
a second C2 extraction slide mounted in the changer tube housing beneath the second changer tube and above the first C2 extraction slide for reciprocable horizontal movement relative to the changer tube housing from a coin holding position to a coin discharging position,
each said extraction slide comprising: a cut-away portion positioned below the changer tube located above the extraction slide and corresponding to the size of the coin contained therein such that the lowermost coin of the first coin tube may be received within the cut-away portion of the C1 extraction slide, the lowermost coin of the second coin tube may be received in the cut-away portion of the first C2 extraction slide, and the second lowermost coin of the second coin tube may be received in the cut-away portion of the second C2 extraction slide; and tab means extending outwardly from the changer tube housing;
a changer slide mounted on the frame for reciprocable horizontal movement relative thereto and spring biased to a dormant position;
means for reciprocating the changer slide from its dormant position to an operative position and back to its dormant position;
a change level slide mounted on the frame for reciprocable vertical movement relative thereto and gravity biased to a downward rest position;
means for positioning the change level slide at any one of four positions of elevated vertical movement relative to its downward rest position;
a captive extracting slide mounted on the changer slide for vertical reciprocable movement relative thereto;
a spring latch pivotally interconnecting the change level slide and the captive extracting slide such that the captive extracting slide may be reciprocated vertically when the change level slide is reciprocated vertically and may be reciprocated horizontally when the changer slide is reciprocated horizontally;
a first slide engaging member affixed to the change level slide;
a second slide engaging member affixed to the captive extracting slide; and
means on said slide engaging members for engaging the tab means of the extraction slides whereby: all of the extraction slides are blocked from movement; all of the extraction slides are moved from their respective coin holding positions to their respective discharging positions; only the C1 extraction slide and the first C2 extraction slide are moved from their respective coin holding positions to their respective coin discharging positions; only the C1 extraction slide is moved from its coin holding position to its coin discharging position; and only the first C2 extraction slide is moved from its coin holding position to its coin discharging position, respectively, when the change level slide is in its downward rest position, its first, second, third, and fourth elevated positions, and when the changer slide is reciprocated from its dormant position to its operative position and back to its dormant position.

33. Coin changer mechanism as claimed in claim 32 and further comprising spring means associated with the changer slide for positioning each of the extraction slides in their respective coin holding positions when the changer slide is positioned in its dormant position.

34. Coin changer mechanism as claimed in claim 32, wherein the said means for reciprocating the changer slide comprises:
a manually operable crank lever pivotally mounted on the frame for reciprocable rotation relative thereto; and
a push member carried by the crank lever and positioned to bear against the changer slide,
whereby the contents of either or of both coin tubes may be depleted by manually induced reciprocable rotation of the crank lever in conjunction with manual elevation of the change level slide to one of its four elevated positions.

35. Coin changer mechanism as claimed in claim 32, wherein the said means for positioning the change level slide comprises:
- a change level lock member affixed to the change level slide;
- four flange members extending from the change level lock member in horizontally disposed parallel alignment; and
- a guide bar affixed to the changer slide and having an inturned flange adapted to engage the change level lock member either below all of the four flange members; between the first and the second flange members; between the second and the third flange members; between the third and the fourth flange members; or above all of the flange members, whereby the downward rest position of the change level slide and the four positions of elevated movement relative thereto are correspondingly defined.

36. Coin changer mechanism as claimed in claim 32, wherein the said means for reciprocating the changer slide comprises:
- an extension portion extending upwardly from the changer slide;
- a driving bar disposed adjacent the extension portion;
- means for reciprocating the driving bar;
- a pivot lever rotatably mounted on the changer slide; and
- means for rotating the pivot lever to an operative position wherein the driving bar is disposed between an end of the pivot lever and the extension portion, whereby horizontal reciprocation of the driving bar is translated into horizontal reciprocation of the changer slide.

37. Coin changer mechanism as claimed in claim 36, wherein the said means for rotating the pivot lever to an operative position comprises:
- a shaft fixedly positioned in the frame;
- a trigger lever rotatably mounted on the shaft;
- spring means normally biasing the trigger lever into engagement with the pivot lever so as to rotate the pivot lever to its operative position; and
- means responsive to the absence of a predetermined number of coins in the coin tubes for rotating the trigger lever against the force of the spring means, whereby the changer slide will remain stationary regardless of any horizontal actuation of the driving bar.

38. Coin changer mechanism as claimed in claim 37, wherein the said means responsive to the absence of a predetermined number of coins in the coin tubes comprises:
- a coin sensing lever rotatably mounted on the shaft;
- an aperture provided in one of the coin tubes;
- a pin carried by the sensing lever and adapted to engage the trigger lever; and
- spring means normally biasing the sensing lever into a position such that a portion thereof is received within the aperture, whereby the presence of a predetermined number of coins in the coin tube provided with the aperture will prevent the said portion of the sensing lever from entering into the aperture such that the pin of the sensing lever is withdrawn from engagement with the trigger lever.

39. Coin changer mechanism adapted to selectively dispense a predetermined number of coins of a C1 denomination or of a C2 denomination or of both denominations of a given currency system, which comprises:
- a frame;
- a changer tube housing affixed to the frame;
- a first coin tube vertically seated in the changer tube housing and dimensioned to receive coins of the C1 denomination in stacked alignment therein;
- a second coin tube vertically seated in the changer tube housing and dimensioned to receive coins of the C2 denomination in stacked alignment therein;
- a first inclined chute extending from the upper end of the first coin tube and having a width greater than the diameter of a coin of the C1 denomination but less than the diameter of the next largest coin of the given currency system;
- first aperture means provided in the first inclined chute and having maximum dimensions in perpendicular dimensions which are less than the diameter of a coin of the C1 denomination but greater than the diameter of a next smallest coin of the given currency system;
- a second inclined chute extending from the upper end of the second coin tube and having a width greater than the diameter of a coin of the C2 denomination but less than the diameter of a next largest coin of the given currency system;
- second aperture means provided in the second inclined chute and having maximum dimensions in perpendicular directions which are less than the diameter of a coin of the C2 denomination but greater than the diameter of a next smallest coin of the given currency system;
- C1 extraction slide means mounted in the changer tube housing beneath the first coin tube for reciprocable horizontal movement relative to the changer tube housing from a coin holding position to a coin discharging position;
- C2 extraction slide means mounted in the changer tube housing beneath the second changer tube for reciprocable horizontal movement relative to the changer tube housing from a coin holding position to a coin discharging position,
- each said extraction slide means having a suitable aperture therein to receive the lowermost coin of its associated coin tube when the said extraction slide means is located in its coin holding position;
- a resilient spring plate tube bottom, one end of which is affixed to the changer tube housing beneath the C1 and C2 extraction slide means and the free end of which extends diametrically across the apertures of the C1 and C2 extraction slide means;
- a changer slide mounted on the frame for reciprocable horizontal movement relative thereto from a dormant position;
- means for reciprocating the changer slide from its dormant position to an operative position and back to its dormant position;
- a change level slide mounted on the frame for reciprocable vertical movement relative thereto and gravity biased to a downward rest position;
- means for positioning the change level slide at a position of elevated vertical movement relative to its downward rest position;
- a captive extracting slide mounted on the changer slide for vertical reciprocable movement relative thereto;
- means interconnecting the change level slide and the captive extracting slide such that the captive extracting slide may be reciprocated vertically when the change level slide is reciprocated vertically and may be reciprocated horizontally when the changer slide is reciprocated horizontally;
- a first slide engaging member affixed to the change level slide;
- a second slide engaging member affixed to the captive extracting slide; and
- means on said slide engaging members for selectively engaging either or both of the C1 and C2 extraction slide means whereby the extraction slide means may be blocked from movement or moved from their respective coin holding positions to their respective coin discharging positions in accordance with the dispositions of the change level slide and of the changer slide.

40. A receptacle for storing coins in stacked alignment comprising:
- a tube housing having an aperture therein;
- a coin tube having an uppermost portion and a lowermost portion and being vertically seated in the tube housing by placement of the lowermost portion thereof in the aperture of the tube housing;
- means for inserting coins in the uppermost portion of the coin tube;
- a resilient spring plate tube bottom, one end of which is affixed to the tube housing and the free end of which extends diametrically across the lowermost portion of the coin tube; and
- means for ejecting coins from the bottom of the coin tube,
- whereby a first coin inserted in the uppermost portion of the coin tube will fall through the coin tube until impeded by the resilient spring plate tube bottom and subsequent coins inserted in the uppermost portion of the coin tube will fall through the coin tube until impeded by another coin previously positioned therein, such that the resilient spring plate tube bottom may resiliently absorb the impact of a falling coin and whereby the spring plate tube bottom will yield, when an attempt is accidentally made to eject two coins from the tube at once, to thereby release both coins and prevent the tube output from jamming.

41. An open-close snap action escrow unit for coin responsive vending equipment comprising:
- a frame;
- gate means rotatably mounted on the frame;
- coin chute means disposed beneath the gate means;
- lock means adapted to urge the gate means to a locked coin-receiving position which defines an escrow space for the reception of deposited coins;
- driving spring means interconnecting the gate means and the frame and normally biasing the gate means against the action of the lock means to an opened coin-discharging position; and
- over-center spring means for reciprocally moving the lock means into and out of locking engagement with the gate means so as to effect snap movements of the gate means between the coin-receiving and the coin-discharging positions respectively.

42. An open-close snap action escrow unit for coin responsive vending equipment comprising:
- a frame;
- a gate rotatably mounted on the frame;
- a close lever normally urging the gate to a coin-receiving position which defines an escrow space for the reception of deposited coins;
- coin chute means disposed beneath the gate;
- a driving spring interconnecting the frame and the gate and biased to urge the gate to rotate relative to the frame to a coin-discharging position such that a retained coin will fall into the coin chute means;
- a crank operatively connected to the close lever;
- lock means rotatably mounted on the frame and normally engaging the crank so as to urge the close lever against the gate;
- an over-center spring interconnecting the lock means and the crank; and
- means for rotating the lock means in one direction in order to disengage the lock means from the crank whereby the over-center spring causes the crank to move the close lever out of engagement with the gate so that the driving spring may snap the gate to its coin-discharging position and in the opposite direction in order to engage the lock means with the crank whereby the over-center spring causes the crank to move the close lever into engagement with the gate against the force of the driving spring in order to snap the gate into its coin-receiving position.

43. An escrow unit for coin responsive vending equipment comprising:
- a frame;
- coin receipt gate means rotatably mounted on the frame;
- coin return gate means rotatably mounted on the frame, the said gate means being adapted to interlace in a coin-receiving position so as to define an escrow space for the reception of deposited coins;
- coin receipt chute means disposed beneath the coin receipt gate means;
- coin return chute means disposed beneath the coin return gate means;
- opening spring means for each gate means biasing each of the gate means for rotation to an open non-interlaced coin-discharging position;
- crank means for each gate means adapted to act against the said opening spring means and to lock each gate means in a closed interlaced coin-holding position;
- means for reciprocally moving the crank means associated with the coin receipt gate into and out of locking engagement therewith; and
- over-center spring means for reciprocally moving the crank means associated with the coin return gate means into and out of locking engagement therewith so as to effect snap movements of the coin return gate means between its coin-holding and its coin-discharging positions respectively.

44. Escrow mechanism for coin responsive vending equipment having a changer tube arrangement therein, which comprises:
- a frame;
- a coin deposit gate rotatably mounted on the frame;
- a coin return gate rotatably mounted on the frame, the said gates being adapted to interlace in a coin-receiving position so as to define an escrow space therebetween;
- coin deposit chute means disposed beneath the coin deposit gate;
- coin return chute means disposed beneath the coin return gate;
- a coin receipt chamber mounted on the frame above the coin deposit and coin return gates;
- a blocking pivot lever rotatably mounted in the coin receipt chamber;
- a coin holding lever rotatably mounted in the coin receipt chamber adjacent the blocking pivot lever so as to define a coin-holding pocket between the said levers;
- a coin slide chute leading from the pocket of the coin receipt chamber to the changer tube of the vending equipment;
- first crank means for rotating the coin deposit gate toward and away from the coin return gate between its coin-holding and a coin-discharging position;
- second crank means for rotating the coin return gate toward and away from the coin deposit gate between its coin-holding and a coin-discharging position;
- first link means operatively interconnecting the first crank means and the coin holding lever; and
- second link means operatively interconnecting the second crank means and the blocking pivot lever,
- whereby, for each vending cycle, a first coin of a given denomination deposited into the coin receipt chamber may be received in the pocket and subsequent coins of the same denomination may bounce off the the first coin retained in the pocket for travel into the escrow space, whereupon actuation of the first crank means rotates the coin holding lever so as to allow the first coin retained in the pocket to drop into the coin slide chute leading to the changer tube and so as to rotate the coin deposit gate to its coin-discharging position so that any subsequent coins contained in the escrow space will fall into the coin deposit chute means, and whereupon actuation of the second crank means may rotate the blocking pivot lever so that any coin contained therein will fall into the escrow space and may rotate the coin return gate to its coin-discharging position so that any coins contained in the escrow space will fall into the coin return chute means.

45. Escrow mechanism as claimed in claim 44 and further comprising a full blocking lever rotatably mounted on the frame, the said full blocking lever having an end portion which is adapted for movement into the coin-holding pocket between the coin-holding lever and the blocking pivot lever so as to cause any coin deposited in the coin receipt chamber to bounce off the said end portion for travel into the escrow space; and means responsive to the number of coins contained in the changer tube for rotating the said end portion of the full blocking lever into and out of the vicinity of the said pocket such that coins will be blocked from the said pocket when a sufficient number of coins are contained in the changer tube and will be allowed to enter into the said pocket when an insufficient number of coins are contained in the changer tube.

References Cited by the Examiner
UNITED STATES PATENTS

| | | | |
|---|---|---|---|
| 635,943 | 10/1899 | Scott | 133—1 |
| 1,197,101 | 9/1916 | Broderick | 133—2 |
| 1,819,235 | 8/1931 | Donnellan | 133—8 |
| 2,610,253 | 9/1952 | Schreiber et al. | |
| 2,764,990 | 10/1956 | Pick | 133—3 |
| 3,139,167 | 6/1964 | Wittern | 194—1 |

FOREIGN PATENTS

| | | |
|---|---|---|
| 4,162 | 2/1907 | Great Britain. |

RAPHAEL M. LUPO, *Primary Examiner.*

LOUIS J. DEMBO, STANLEY H. TOLLBERG,
                                            *Examiners.*